United States Patent
Wong et al.

(10) Patent No.: US 12,314,495 B2
(45) Date of Patent: May 27, 2025

(54) SYSTEM AND METHOD FOR WIRELESS INPUT/OUTPUT (IO) DEVICE INPUT DATA PACKET PAYLOAD COMPRESSION FOR COMMUNICATION WITH WIRELESS COMMUNICATION DONGLE

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/229,530

(22) Filed: Aug. 2, 2023

(65) Prior Publication Data
US 2025/0044886 A1 Feb. 6, 2025

(51) Int. Cl.
*G06F 3/038* (2013.01)
*G06F 13/38* (2006.01)

(52) U.S. Cl.
CPC ............ *G06F 3/038* (2013.01); *G06F 13/385* (2013.01); *G06F 2203/0384* (2013.01)

(58) Field of Classification Search
CPC . G06F 3/038; G06F 13/385; G06F 2203/0384
See application file for complete search history.

(56) References Cited

U.S. PATENT DOCUMENTS

| | | | |
|---|---|---|---|
| 7,801,099 B2 | 9/2010 | Desai | |
| 7,853,663 B2 | 12/2010 | Hoerl | |
| 8,364,080 B2 | 1/2013 | Desai | |
| 8,699,424 B2 | 4/2014 | Chandra | |
| 8,823,494 B1 * | 9/2014 | Kovitz | H04W 12/50 398/128 |
| 8,913,599 B2 | 12/2014 | Gonikberg | |

(Continued)

FOREIGN PATENT DOCUMENTS

EP 1841149 B1 11/2017

*Primary Examiner* — Henry Tsai
*Assistant Examiner* — Aurangzeb Hassan
(74) *Attorney, Agent, or Firm* — Prol Intellectual Property Law, PLLC; H. Kenneth Prol

(57) ABSTRACT

A wireless input/output (IO) device input data packet payload compression system of a wireless communication dongle at an information handling system may comprise a controller to instruct an operatively connected wireless IO device to transmit a selected number of compressed input data packets including a compressed wireless IO device input data payload of compressed or truncated wireless IO device input data and having a selected compressed data packet length, the wireless radio system of the wireless communication dongle to receive the selected number of compressed input data packets of the selected compressed data packet length from the wireless IO device, the controller to execute code instructions to translate the compressed input data into reassembled input data for the wireless IO device, and the controller to generate a human interface device report that includes the reassembled input data for processing by an operating system of the information handling system.

20 Claims, 5 Drawing Sheets

(56) References Cited

U.S. PATENT DOCUMENTS

| | | | | |
|---|---|---|---|---|
| 2014/0047143 A1* | 2/2014 | Bateman | ............ | H04L 65/1069 |
| | | | | 710/72 |
| 2014/0280709 A1* | 9/2014 | Li | ........................ | G06F 13/385 |
| | | | | 709/217 |
| 2015/0254193 A1* | 9/2015 | Priest | .................... | G06F 13/385 |
| | | | | 710/5 |
| 2016/0360526 A1* | 12/2016 | Lehmann | ............... | G06F 3/0227 |
| 2018/0139131 A1* | 5/2018 | Ignatchenko | ........... | H04L 47/32 |
| 2019/0197556 A1* | 6/2019 | Moshal | ................ | G06Q 20/326 |
| 2019/0371096 A1* | 12/2019 | Fisher | ................. | G07C 9/00904 |
| 2020/0146097 A1* | 5/2020 | Haartsen | ............. | H04M 1/6066 |
| 2023/0171191 A1* | 6/2023 | Ignatchenko | ......... | H04L 45/745 |
| | | | | 370/392 |

\* cited by examiner

SYSTEM AND METHOD FOR WIRELESS INPUT/OUTPUT (IO) DEVICE INPUT DATA PACKET PAYLOAD COMPRESSION FOR COMMUNICATION WITH WIRELESS COMMUNICATION DONGLE

FIELD OF THE DISCLOSURE

The present disclosure generally relates to wireless peripheral input/output (IO) devices, such as mice, gaming controller, keyboards, earbuds, headphones, headsets, and virtually reality peripherals. More specifically, the present disclosure relates to a wireless communication from a wireless communication dongle or an information handling system, operating independently from the information handling system operating system (OS) for orchestrating compression by one or more wireless peripheral IO devices of input data packets and decompression by the wireless communication dongle or information handling system prior to and following transmission of the input data packets from the wireless peripheral IO device to the information handling system that increases data transmission rate.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, gaming controller, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
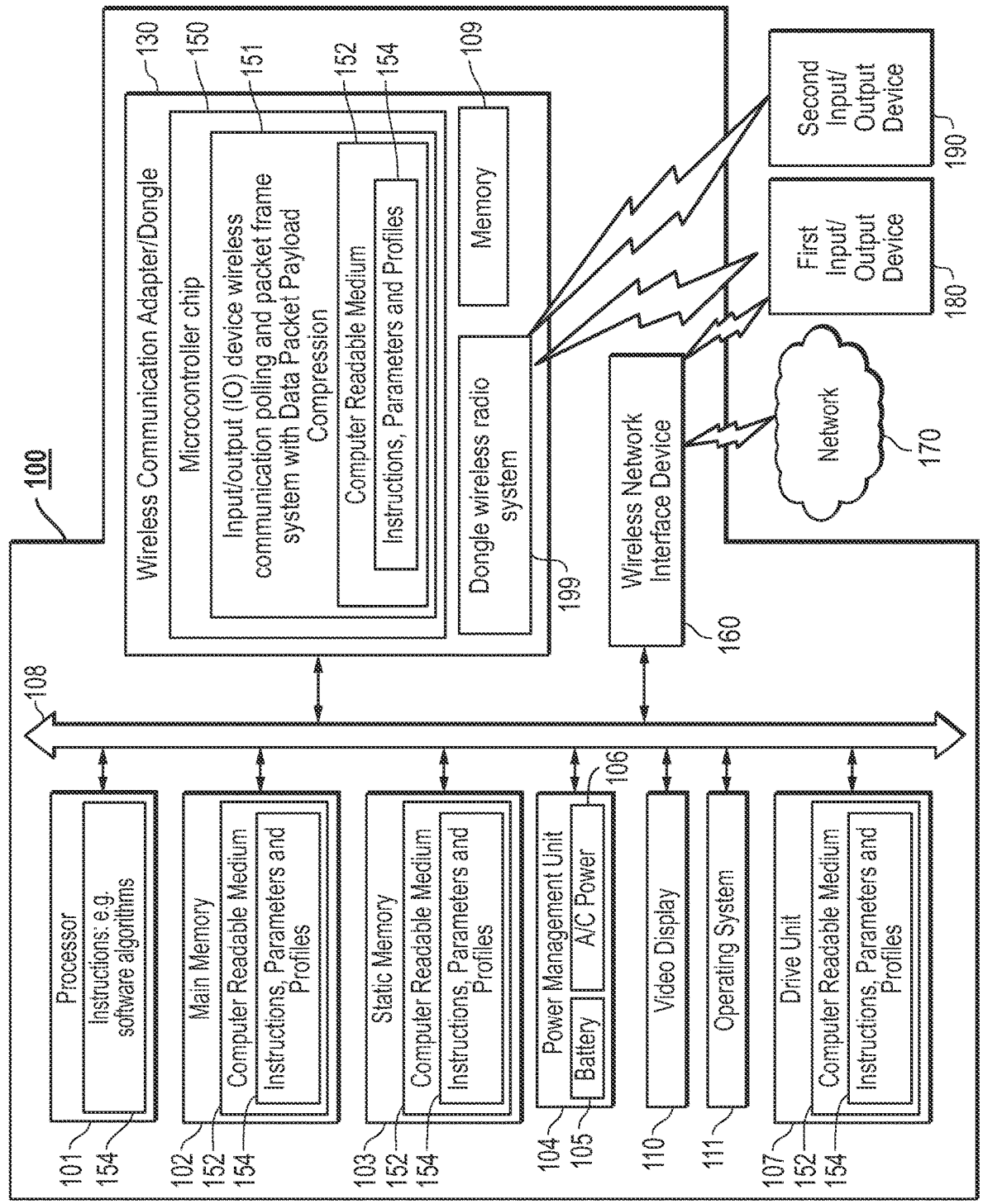
FIG. 1 is a block diagram illustrating an information handling system with a wireless radio system or operatively coupled to a wireless communication dongle orchestrating wireless communication via an input/output (IO) device wireless communication polling and packet frame system with data packet payload compression with one or more wireless IO devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices (e.g., mouse, touchpad, gaming controller, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Wireless peripheral IO devices are also referred to as wireless IO devices herein. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with the Bluetooth® Low Energy (BLE) communication standard.

For example, many existing wireless IO devices are designed to communicate with a wireless communications dongle using a one reception/one transmission (1RX/1TX)

format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, and requires more airtime for acknowledgment (ACK) data packets acknowledging receipt of wireless IO device input data packets at the wireless radio system for the wireless communication dongle or information handling system. Such a 1RX/1TX system may be limited in data throughput, consume power unnecessarily for such transmit and receive switches during operations, and require a certain amount of spacing between transmission of multiple wireless IO device input data packets from the wireless IO device to the wireless communication dongle or information handling system in order to allow for transmission of an ACK data packet in between transmission of such multiple wireless IO device input data packets. Such systems may cause the customer to experience slow response from a wireless IO device, a lag between their input via the wireless IO device (e.g., movement of the mouse) and the corresponding feedback displayed by the information handling system (e.g., movement of the cursor). As a result, existing systems employing this 1RX/1TX approach may fail to meet customer needs during execution of latency-sensitive software applications such as gaming applications or other high definition audio/visual applications.

Embodiments of the present disclosure employ a customized wireless IO device communication protocol by performing data modulation on wireless IO device data packets transceived using the BLE radio layer protocol in order to allow for transmission of a plurality of data packets from the wireless IO device to the wireless radio system between ACK data packets transmitted from the wireless radio system to the wireless IO device. A controller for a wireless radio system of a wireless communication dongle may execute code instructions, such as firmware, of a IO device wireless communication polling and packet frame system with data packet payload compression according to embodiments of the present disclosure. The controller for a wireless radio system of a wireless communication dongle or information handling system in embodiments may orchestrate scheduled delivery of a plurality of data packets from each of one or more wireless IO devices in a data packet communication frame between delivery of ACK data packets in a polling packet with instructions for a selected number of data packets and selected data packet length in allotted timeslots to each of one or more wireless IO devices. In embodiments of the present disclosure, a wireless radio adapter, such as in a wireless communications dongle, may receive a request to connect from one or more wireless IO devices (e.g., mouse and gaming controller), and may respond by transmitting a polling packet that instructs each of the wireless IO devices paired with the wireless communications dongle to transmit a selected number of data packets of a selected packet length and at specified time slots during a first data packet communication frame between the wireless communications dongle and each of the paired wireless IO devices.

The controller at the wireless communications dongle may ensure that, during this data packet communication frame in which time slots have been allocated to the one or more wireless IO devices (e.g., mouse and gaming controller), the wireless radio system, such as in the wireless communication dongle, remains in a receive mode to receive a plurality of wireless IO device input data packets from the one or more paired wireless IO devices in accordance with the selected number of packets prescribed and the duration (e.g., based on selected packet lengths) from each of the one or more wireless IO devices. Following the data packet communication frame at the end of a time period determined by the selected number of packets expected, selected packet lengths, and any spacing time, the controller of the wireless communications dongle or other wireless radio adapter may switch to transmit mode and transmit to each of the paired wireless IO devices an acknowledgement (ACK) as part of a next polling packet identifying the number of packets received during the data packet communication frame from each of the paired wireless IO devices. Such an orchestrated delivery of a plurality of wireless IO device input data packets within the data packet communication frame may allow for the transmission of a wireless IO device input data packet up to every 0.000125 seconds (125 µs), or at a rate of 8,000 packets per second. Use of this orchestrated delivery method in embodiments of the present disclosure may allow the wireless IO device to transmit input data (e.g., positional information from a mouse, positional information of a gaming controller, or registered keystrokes from a keyboard) at a high transmission rate, and also to register that input data within the wireless IO device at a high sample rate. In other words, a wireless mouse or gaming controller may take positional measurements more frequently, or a keyboard may register keystrokes in smaller intervals.

Existing wireless IO devices transceive data packets adhering to the Universal Serial Bus (USB) Human Interface Device (HID) reporting formats for various types of devices that is not well-suited for these higher sample rates. For example, a wireless mouse or gaming controller may transceive positional information for the mouse or gaming controller according to the USB HID reporting format that requires the positional data to include an eight byte description of an initial position and an eight byte description of a next adjusted position for the mouse or the gaming controller console. However, positional data sampled in intervals less than 250-500 microseconds apart may be expressed by providing the initial position, along with a change in position or position offset value away from this initial position instead. Such a change in position or position offset value may be expressed in two bytes, in comparison to the eight bytes describing a next adjusted position.

As another example, following the USB HID format for keyboard input information, a wireless keyboard may transceive keystroke information including six keystroke indicators for possible six keystrokes, each comprising one byte of data, plus one byte reserved, and one byte for registering modifier keys, for a total of eight bytes in HID format. In other words, this format requires that each data packet reserve space to describe the user pressing six different keys, which becomes increasingly unlikely to occur as the sample rate for the keyboard increases (e.g., a user is unlikely to press more than a few keys within a 1,000 microsecond data packet communication frame). The USB HID format for keyboards thus requires each data packet to include eight bytes of keystroke data, even if, as is typical, only a single, two or three keystrokes are registered at one time. A single keystroke value, for example, results in five bytes of data indicating null values or the lack of a detected keystroke. Thus, transmission of wireless IO device input data in the USB HID format may result in transmission of larger wireless IO device input data packets than are necessary to communicate received input values to the information handling system effectively when the wireless IO device is operating at a high sample rate afforded by the orchestrated transmission of data packets in embodiments of the present disclosure. These larger input data packet payloads may further lead to slower transmission rates, higher radiofrequency airtime occupancy, and higher power consumption. A system is needed for a wireless IO device communication protocol to increase transmission rates and lower power consumed during transmission of wireless IO device input data packets between one or more wireless IO devices and wireless radio adapters such as wireless communications dongles.

The IO device wireless communication polling and packet frame system with data packet payload compression in embodiments of the present disclosure addresses these issues by orchestrating compression of wireless IO device input data packet payloads prior to transmission of those wireless IO device compressed input data packets and decompression of the payload from the wireless IO device compressed input data packets at a communication dongle or wireless radio of an information handling system. In embodiments of the present disclosure, the initial polling packet transmitted by the controller for the wireless communication dongle or information handling system may define a selected number of compressed input data packets (e.g., up to six) and a selected compressed data packet length (e.g., in bytes) that instructs the number and length of data packets the wireless IO device should transmit to the wireless communication dongle or information handling system during the next data packet communication session and that the data packets should be compressed according to type of wireless IO device. The wireless IO device (e.g., mouse, gaming controller, or keyboard) that receives this initial polling packet may use these selected packet number or selected packet length values from within the initial polling packet to set a sample rate at which the wireless IO device (e.g., mouse or keyboard) takes input (e.g., measures position of the mouse or registers keystrokes). For example, in an embodiment in which the initial polling packet instructs delivery of a wireless IO device compressed input data every 125 µs (e.g., to give a transmission rate of 8,000 packets per second), the wireless IO device may set its sample rate to 125 us or less. In the case of a mouse, this indicates positional measurements taken every 125 µs, and in the case of a keyboard, this indicates detection of keypresses every 125 µs.

Setting of such a high sample rate or selection within the initial polling packet of a shorter wireless IO device compressed input data length in embodiments of the present disclosure may prompt a microcontroller executing code instructions of a IO device wireless communication polling and packet frame system agent with data packet payload compression to compress the wireless IO device input data detected at the wireless IO device prior to transmission of that wireless IO device input data as a payload of a wireless IO device compressed input data to the wireless communication dongle or information handling system. The microcontroller of the wireless IO device in embodiments herein may include a portion of the data usually included in data packets adhering to the USB HID format requirements described above and a portion that is a compressed offset data value relative to a previous USB HID data value, in order to decrease the payload of the wireless IO device compressed input data packets transceived. For example, as described herein, positional data sampled in intervals less than 250-500 microseconds apart may be expressed by providing the initial position as an HID value, along with a change in position away from this initial position as an offset data value in a next data packet or set of bytes, rather than providing the initial position HID value and the adjusted position HID value in a next data packet or set of bytes. In embodiments in which a wireless mouse has set a sample rate to less than 250-500 microseconds between positional measurements, or in which the initial polling packet instructs transmission of packets in intervals less than 250-500 microseconds apart, the controller for the wireless mouse may express positional measurements in each of such wireless IO device compressed input data packets as an initial position in a first set of bytes in a packet and a change or offset value in position away from that initial position as offset value bytes in successive sets of bytes of data within data packet payload. This compressed expression of positional measurement may decrease the size of the wireless IO device compressed input data containing this compressed positional measurement having offset values in later position data by six bytes in comparison to the size of a wireless IO device input data packet containing each positional measurement adhering to the USB HID format.

As another example, as described herein, the USB HID format for keyboards requires that each data packet reserve space to describe the user pressing six different keys, which becomes increasingly unlikely to occur as the sample rate for the keyboard increases (e.g., a user is unlikely to press more than a few keys, such as three keys, within a 1,000 microsecond data packet communication frame). In embodiments in which a wireless keyboard has set a sample rate to less than 250-500 microseconds between registering of keystrokes, or in which the initial polling packet instructs transmission of packets in intervals less than 250-500 microseconds apart, the controller for the wireless keyboard may omit any null data (indicating no keys pressed) in each of such wireless IO device compressed input data packets. This compressed expression of keypresses may decrease the size of the wireless IO device compressed input data containing only a series of registered keystrokes in wireless IO device data payload, and excluding null data for unpressed keys, by up to six bytes in comparison to the eight bytes required size of a wireless IO device input data packet containing keystrokes adhering to the USB HID format.

Upon receipt of such wireless IO device compressed input data packets at the wireless radio system for the wireless communication dongle or the information handling system along with head information identifying the type of wireless IO device, the controller for the wireless radio system in embodiments herein may retranslate the compressed wireless IO device input data into the USB HID format for that wireless IO device. The USB HID report generated in such a way to represent standard HID format for wireless IO device data may then be communicated to the operating system (OS) for the information handling system for processing of the uncompressed or reassembled input data for the wireless IO device. The OS of the information handling system may only operate with wireless IO device data that is received in this USB HID format for example, thus requiring the reconversion. In such a way, the IO device wireless communication polling and packet frame system with data packet payload compression may compress input data transmitted from wireless IO devices in the form of payloads for wireless IO device compressed input data packets to wireless communication dongles or information handling systems to take advantage of the higher sampling rate and higher data transmission rates afforded by the orchestration of data packet delivery according to the customized BLE radio layer protocol described herein. This may further improve wireless IO device performance and reduce power consumption and radiofrequency airtime occupancy in some embodiments.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of an input/output (IO) device wireless communication polling and packet frame system with data packet payload compression 151 in an embodiment to orchestrate scheduled delivery of a plurality of wireless IO device compressed input data packets from each of one or more paired wireless input/output (IO) devices (e.g., 180 and 190) during scheduled data packet communication frames. It is appreciated that information handling system 100 may use a wireless communications dongle or integrated wireless radio adapter 130 to wirelessly communicate with one or more wireless IO devices 180 or 190. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100 may operate using Bluetooth® Low Energy (BLE) radio layer protocol (e.g., BLE radio with Gaussian Frequency Shift Keying (GFSK) data modulation), as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices such as static memory 103 or drive unit 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications dongle 130, which may orchestrate scheduled delivery of a plurality of wireless IO device compressed input data packets from each of one or more wireless input/output (IO) devices (e.g., 180 and 190) during scheduled data packet communication frames according to various embodiments of the present disclosure. The wireless communication adapter/dongle 130 in an embodiment may receive a plurality of wireless IO device compressed input data packets, each comprising a payload of input data from one of the wireless IO devices (e.g., 180 and 190). For example, the wireless communication adapter/dongle 130 in an embodiment may receive a plurality of wireless IO device compressed input data packets from a wireless mouse (e.g., 180), each containing a payload of positional information for the wireless mouse (e.g., 180) comprising compressed positional information from a USB human interface device (HID) formatted report and offset data from one position data point generated at the wireless mouse 180, as described in greater detail below with respect to FIGS. 2 and 5. As another example, the wireless communication adapter/dongle 130 in an embodiment may receive a plurality of wireless IO device compressed input data packets from a wireless keyboard (e.g., 190), each containing a payload of registered keystrokes from the wireless keyboard (e.g., 190) comprising truncated and consolidated information from a USB human interface device (HID) formatted report for keystrokes generated at the wireless keyboard 190, as described in greater detail below with respect to FIGS. 2 and 5.

Upon receipt of the plurality of wireless IO device compressed input data packets from the wireless IO device(s) (e.g., 180 or 190) in an embodiment, the controller 150 for the wireless communication adapter/dongle 130 may execute code instructions of the IO device wireless communication polling and packet frame system with data packet payload compression 151 to generate a USB HID formatted report that contains the compressed or truncated wireless IO device input data with offset data for positional data or consolidated data (e.g., keystrokes) contained within the received wireless IO device compressed input data packets in a data packet frame. The information handling system 100 may include an operating system (OS) 111 that processes incoming data from various IO devices, including the wireless IO devices 180 and 190. Such an OS 111 in an embodiment may be capable of processing such IO data only when received in the USB HID format. As described herein, the wireless IO device compressed input data packets may only include a portion of information required for a USB HID report meeting these standards such as a first HID format for positional data or an unconsolidated set of keystroke data including null values for unpressed keys. As such, the controller 150 in an embodiment may execute code instructions of the IO device wireless communication polling and packet frame system with data packet payload compression 151 to insert or translate the received payloads of the wireless IO device compressed input data packets into a standard USB HID compliant report and to add any additionally necessary (e.g., previously truncated) data not included within the wireless IO device compressed input data packets.

For example, the USB HID format for a mouse may require 8 bytes of initial position measurement data (e.g., $(X_0, Y_0)$) and eight bytes of adjusted positional measurement data (e.g., $(X_1, Y_1)$) for the mouse. In such an embodiment, the wireless IO device compressed input data packet received from a wireless mouse (e.g., 180) may contain only the eight byte initial positional measurement data (e.g., $(X_0, Y_0)$) and then two bytes indicating an offset change value in positional measurement (e.g., $\Delta X$, $\Delta Y$) relative to this initial position measurement data in successive data bytes or packets. The controller 150 executing code instructions of the IO device wireless communication polling and packet frame system with data packet payload compression 151 in such an embodiment may determine the adjusted positional measurement data ((e.g., $(X_1, Y_1)$) by adding or subtracting the offset change value in positional measurement (e.g., $\Delta X$, $\Delta Y$) to the initial positional measurement data (e.g., $(X_0, Y_0)$) as successive data bytes and data packets are received. The controller 150 executing code instructions of the IO device wireless communication polling and packet frame system with data packet payload compression 151 in such an embodiment may then generate a USB HID report containing the eight bytes of initial position measurement data (e.g., $(X_0, Y_0)$) taken directly from the wireless IO device compressed input data packet and then eight bytes of adjusted position measurement data (e.g., $(X_1, Y_1)$) determined based on the offset change values in positional measurement (e.g., $\Delta X$, $\Delta Y$) received in successive data bytes. The USB HID report in such an embodiment may then be transmitted to the OS 111 for translation of the positional measurements of the mouse into movement of the cursor on the video display 110 or translation of keystrokes received from a wireless keyboard to the OS 111.

As another example, the USB HID format for a keyboard may require a total of eight bytes, with one byte for registering a modifier key, one byte reserved, and up to six bytes, each for registering of one normal key stroke. Thus, up to six bytes total for six different normal keystrokes, are potentially registered during each keystroke scan. Often no normal keys are pressed, causing at least 6 bytes to contain null values. Because the wireless keyboard (e.g., 190) in an embodiment may be operating at a high sample rate (e.g., less than 250-500 microseconds), it is highly likely that more than only one or two keystrokes may be registered during each keystroke scan. Thus, up to six bytes of data within each USB HID report and in a wireless IO device data packet frame for a keyboard may include null data, indicating a lack of a keystroke. In such an embodiment, the wireless IO device compressed input data packet received from a wireless keyboard (e.g., 190) may remove or truncate the null data such that the wireless IO device compressed input data packet only contains the number of bytes of data for keystrokes that were actually registered during the previous scan to consolidate the data packet communication frame for only the bytes of data for actual keystrokes. The controller 150 at the wireless communication adapter/dongle 130 executing code instructions of the IO device wireless communication polling and packet frame system with data packet payload compression 151 in such an embodiment may then regenerate a USB HID report after receiving the compressed wireless IO device data packets from the truncated input data in the wireless IO device compressed input data packet. The regenerated USB HID report contains the eight bytes that includes six bytes of normal keystroke data by inserting the null data back into the truncated input data in the payload for the wireless IO device compressed input data packet, and providing null data in each of the reserved one byte slots that were truncated from the payload to form the wireless IO device compressed input data packet. The USB HID report in such an embodiment may then be transmitted to the OS 111 for translation of the registered keystrokes of the keyboard into operational actions for a software application (e.g., Ctrl+C causing execution of a copy function) or display of characters on the video display 110.

The wireless communication dongle 130 or integrated wireless radio adapter in an embodiment may house a microcontroller 150 executing firmware instructions of the IO device wireless communication polling and packet frame system with data packet payload compression 151 in an embodiment. The wireless communication dongle 130 may be operatively coupled to the information handling system 100 through insertion of the wireless communication dongle 130 within a Universal Serial Bus (USB) port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio layer protocol (e.g., BLE radio with Gaussian Frequency Shift Keying (GFSK) data modulation), as modified with the wireless IO device communication protocol of embodiments herein, with the wireless communication adapter/dongle 130. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio layer protocol (e.g., BLE radio with Gaussian Frequency Shift Keying (GFSK)

data modulation) as modified with the wireless IO device communication protocol of embodiments herein, for example. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, gaming controller, earbuds, headphones, smart speakers, or virtual reality peripherals, as described in greater detail herein. Such wireless links may be established pursuant to BLE radio layer protocol, for example. In some embodiments, BLE radio layer protocol with GFSK data modulation as modified with the wireless IO device communication protocol of embodiments herein may be used to establish a Private Area Network (PAN) (e.g., 170) in which the information handling system 100 may communicate wirelessly with any wireless IO devices (e.g., 180 and 190) paired to the PAN 170 using a BLE radio layer protocol (e.g., BLE radio with GFSK data modulation) compliant pairing and wireless communication profile. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHZ. Reference to Bluetooth® may refer to either or both of the Bluetooth® or Bluetooth Low Energy (BLE) and any revision of those protocols.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® data communication standards, as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of a IO device wireless communication polling and packet frame system with data packet payload compression 151, or other aspects or components. Application instructions 154 may also include any application processing drivers, or the like executing on information handling system 100 or wireless communication dongle 130.

The IO device wireless communication polling and packet frame system with data packet payload compression 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the IO device wireless communication polling and packet frame system with data packet payload compression 151, firmware, processes, and/or methods may be stored here. More specifically, instructions 154 may be executed by microcontroller integrated circuit 150 or other processing resources such as an embedded controller (EC) or the processor 101 to orchestrate transmission of wireless IO device compressed input data packets from one or more wireless IO devices 180 and 190 with the wireless communication dongle 130 during a data packet communication frame according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the IO device wireless communication polling and packet frame system with data packet payload compression 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and a plurality of wireless IO devices (e.g., 180 and 190), the microcontroller 150 may execute code instructions 154 of the IO device wireless communication polling and packet frame system with data packet payload compression 151 to orchestrate transmission of a plurality of wireless IO device compressed input data packets from one or more of the wireless IO devices (e.g., 180 or 190) during one or more data packet communication frames, as described in embodiments herein.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
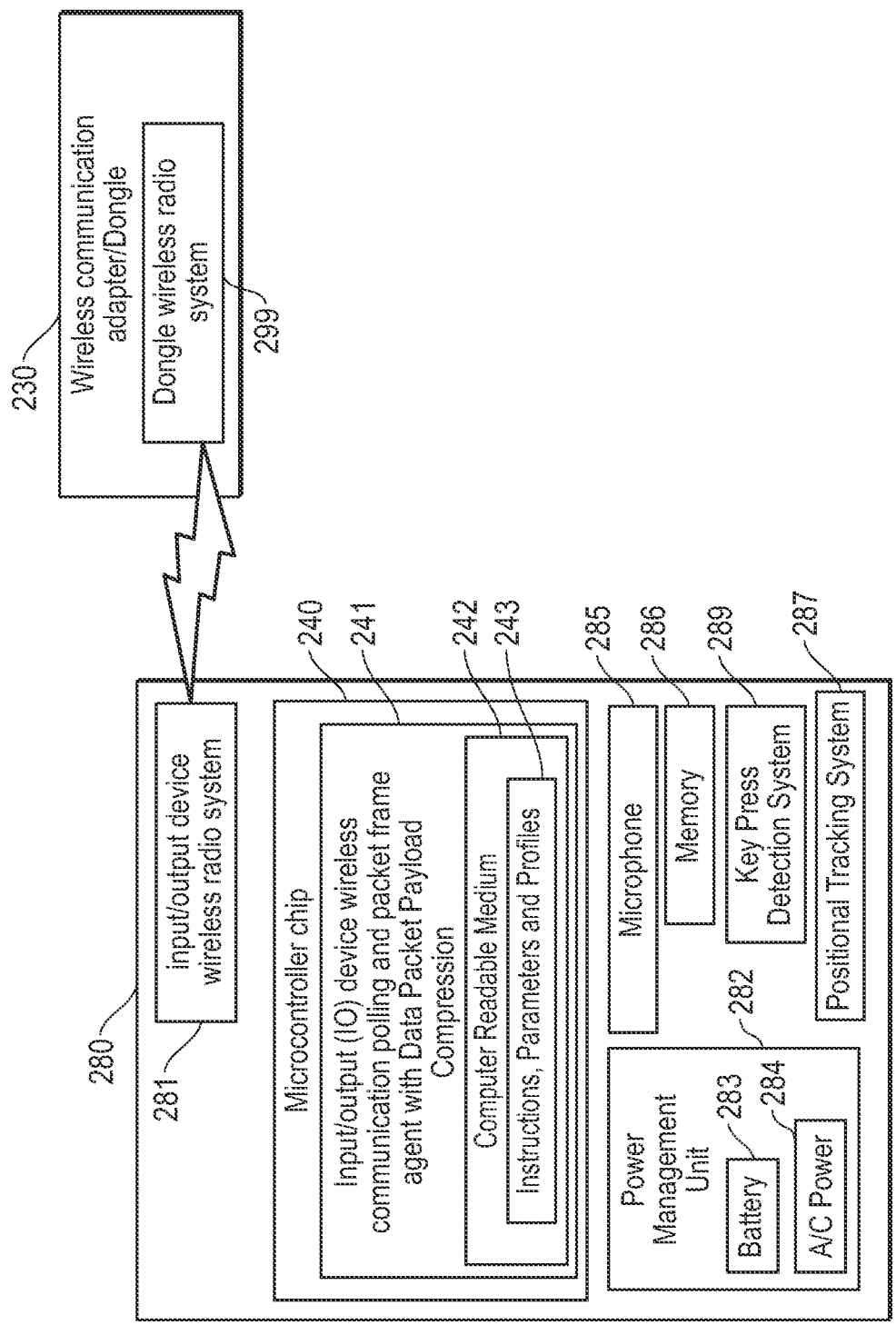
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of a IO device wireless communication polling and packet frame agent with data packet payload compression 241 at the wireless IO device 280 to transmit wireless IO device compressed input data packets from the wireless IO device 280 to the wireless communication dongle 230 during a data packet communication frame according to orchestrating instructions received from the wireless communication dongle 230. As described herein, the wireless communication dongle 230 in an embodiment may include a controller executing code instructions of a IO device wireless communication polling and packet frame system with data packet payload compression to orchestrate transmission of plural wireless IO device compressed input data packets from one or more paired wireless IO devices (e.g., 280) during any data packet communication frame. Such an orchestration may be initiated by transmission from the dongle wireless radio system 299 to the IO device wireless radio system 281 of one or more polling packets to each elicit plural data packets, as described herein. The wireless input/output (IO) device input data packet payload compression agent 241 of the wireless IO device 280 may operate to generate wireless IO device compressed input data packets and to instruct the IO device wireless radio system 281 to transmit those compressed data packets within a synchronized data packet communication frame between the wireless communication dongle 230 and the wireless IO device 280 according to the instructions in received polling packets having coordinating instructions as to number of packets, packet lengths, and time slots to be used.

The IO wireless radio system 281 in an embodiment may be capable of communication between the wireless IO device 280 and the wireless communication dongle 230 using a wireless link established under Bluetooth® or Bluetooth Low Energy (BLE) radio layer protocols (e.g., with Gaussian Frequency Shift Keying (GFSK) data modulation) as modified with the wireless IO device communication protocol of embodiments herein, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to BLE radio layer protocols (e.g., with Gaussian Frequency Shift Keying (GFSK) data modulation) as modified with the wireless IO device communication protocol of embodiments herein, for example. The IO device wireless radio system 281 may operate in accordance with any Bluetooth® data communication standards or BLE radio layer protocols (e.g., with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse, the wireless IO device 280 may further include a position tracking system 287 capable of recording or tracking changes in position of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein.

As also described herein, existing wireless IO devices transceive data packets adhering to the Universal Serial Bus (USB) Human Interface Device (HID) reporting formats for various types of devices that is not well-suited for these higher sample rates. For example, a wireless mouse (e.g., 280) may transceive positional information for the mouse (e.g., 280) according to the USB HID reporting format that requires the positional data to include an eight byte description of an initial position and an eight byte description of each subsequently adjusted position for the mouse. However, positional data sampled in intervals less than 250-500 microseconds apart may be expressed by providing the initial position, along with a offset change in position away from this initial position to achieve compression of payload data according to embodiment herein. Such a offset change in position may be expressed in two bytes to generate wireless IO device compressed input data, in comparison to the eight bytes describing a subsequent adjusted position.

In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. Following the USB HID format for keyboard input information, a wireless keyboard (e.g., 280) may transceive keystroke information including up to six indicators for possible keystrokes, each comprising one byte of data. In other words, this format requires that each data packet reserve space to describe the user pressing six different keys, which becomes increasingly unlikely to occur as the sample rate for the keyboard (e.g., 280) increases (e.g., a user is unlikely to press more than a few keys within a 1,000 microsecond data packet communication frame). The USB HID format for keyboards thus requires each data packet to include six bytes of normal keystroke data, even if only a single keystroke is registered, resulting in five bytes of data indicating null values, or the lack of a detected keystroke. Thus, transmission of wireless IO device input data in the USB HID format may result in transmission of larger wireless IO device input data packets than are necessary to communicate received input values to the wireless communication adapter/dongle 230 effectively when the wireless IO device is operating at a high sample rate afforded by the orchestrated transmission of data packets in embodiments of the present disclosure. These larger input data packet payloads may further lead to slower transmission rates and higher power consumption. To compress this keyboard input data, the actually pressed key data may be truncated and null values in the six bytes dropped to generate wireless IO device compressed input data.

In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein.

Instructions 243 of the IO device wireless communication polling and packet frame agent with data packet payload compression 241 may be executed by the microcontroller chip 250, for example a controller integrated circuit, to transmit such wireless IO device compressed input data packets to the wireless communication dongle 230 at an information handling system pursuant to polling packets generated at the IO device wireless communication polling and packet frame system with data packet payload compression operating at the wireless communication dongle 230 and transmitted to the wireless IO device 280. Such instructions 243 of the IO device wireless communication polling and packet frame agent with data packet payload compression 241 may include instructions for initiating generation of wireless IO device compressed input data packets and instructing transmission of those wireless IO device compressed input data packets by the IO device wireless radio system 281 of an selected data packet number, having an selected data packet length, at allotted data packet transmission time slots, as identified within polling packets received at the wireless IO device 280 from the wireless communication dongle 230.

The polling packet transmitted by the controller for the wireless communication dongle 230 in an embodiment may define a selected number of compressed input data packets (e.g., up to six) and a selected compressed data packet length (e.g., in bytes) that instructs the number and length of data packets the wireless IO device 280 should transmit to the wireless communication dongle 230 during wireless IO device allotted time slots within the next data packet communication session. The controller 240 for the wireless IO device 280 that receives this polling packet may execute code instructions of the IO device wireless communication polling and packet frame agent with data packet payload compression 241 to use these selected values from within the polling packet to set a sample rate at which the wireless IO device 280 takes input (e.g., measures position of the mouse via positional tracking system 287 or registers keystrokes via key press detection system 289). For example, in an embodiment in which the initial polling packet instructs delivery of a wireless IO device compressed input data every 125 μs (e.g., to give a transmission rate of 8,000 packets per second), the wireless IO device 280 may set its sample rate to 125 us or less. In the case of a mouse, this indicates positional measurements taken every 125 us by the positional tracking system 287, and in the case of a keyboard, this indicates detection of keypresses every 125 us by the key press detection system 289.

Setting of such a high sample rate or selection within the polling packet of a shorter wireless IO device compressed input data length in an embodiment may prompt the controller 240 for the wireless IO device 280 to execute code instructions of the IO device wireless communication polling and packet frame agent with data packet payload compression 241 to compress the wireless IO device input data detected at the wireless IO device 280 prior to transmission of that wireless IO device input data as a payload of a wireless IO device compressed input data packets to the wireless communication adapter/dongle 230. The controller 240 of the wireless IO device 280 in an embodiment may include a header portion of the data usually included in data packets adhering to the USB HID format requirements described above, to identify the type of wireless IO device (mouse, keyboard, etc.) in order to notify the decreased the payload from the wireless IO device 280 in the compressed input data packets transceived to the wireless communication adapter/dongle 230.

For example, as described herein, positional data sampled in intervals less than 250-500 microseconds apart may be expressed by providing the initial position, along with data for an offset change in position away from this initial position when a mouse or gaming controller is moved, rather than providing the initial position and a data bytes again for the next adjusted position. In embodiments in which a wireless mouse (e.g., 280) has set a sample rate to less than 250-500 microseconds between positional measurements taken via the positional tracking system 287, or in which the polling packet received from the wireless communication adapter/dongle 230 instructs transmission of packets in intervals less than 250-500 microseconds apart, the controller 240 for the wireless mouse or gaming controller (e.g., 280) may express positional measurements in each of such wireless IO device compressed input data packets as an initial position in a first data packet and the change or offset in position away from that initial position in later wireless device data bytes and later wireless IO device compressed input data packets. This compressed expression of positional measurement may decrease the size of the wireless IO device compressed input data containing this compressed positional measurement by, for example six to ten bytes in most instances, in comparison to the size of a wireless IO device input data packet containing consecutive positional measurements each adhering to the USB HID format.

As another example, as described herein, the USB HID format for keyboards requires that each data packet reserve space to describe the user pressing six different normal keys in six bytes, which becomes increasingly unlikely to occur as the sample rate for the keyboard (e.g., 280) increases (e.g., a user is unlikely to press more than a few keys within a 1,000 microsecond data packet communication frame). In embodiments in which a wireless keyboard (e.g., 280) has set a sample rate to less than 250-500 microseconds between registering of keystrokes, or in which the polling packet received from the wireless communication adapter/dongle 230 instructs transmission of packets in intervals less than 250-500 microseconds apart, the controller 240 for the wireless keyboard (e.g., 280) may omit any null data (indicating no keys pressed) in each of such wireless IO device compressed input data packets. This compressed expression of keypresses may decrease the size of the wireless IO device compressed input data packet containing only registered keystrokes. The data payload savings may be up to six bytes in some embodiments rather than transmitting a data payload with the eight byte required size of a wireless IO device input data packet containing keystrokes adhering to the USB HID format. In such a way, the IO device wireless communication polling and packet frame agent with data packet payload compression 241 may compress input data transmitted from wireless IO devices (e.g., 280) in the form of payloads for wireless IO device compressed input data packets to wireless communication dongles (e.g., 230) or information handling systems to take advantage of the higher sampling rate and higher data transmission rates afforded by the orchestration of data packet delivery according to the customized BLE radio layer protocol described herein.

Identifying information for the wireless IO device 280 may be stored in memory 286 in an embodiment and transmitted in a header with any wireless IO device compressed input data packets for each type of wireless IO device data bytes therein. Such identifying information in an embodiment may operate to identify the wireless IO device 280 type to indicate to the wireless communication dongle 230 what type of compression may have been sent and how to regenerate the HID format report for the wireless IO device. The identifying information may also operate to identify the wireless IO device as a device authorized to transceive data with the dongle 230, as well as information sufficient to identify the wireless IO device 280, such as a Media Access Control (MAC) address, IP address, or model number. In some embodiments, the identifying information for the wireless IO device 280 may identify a maximum sample rate for the wireless IO device 280.

The wireless IO device 280 may, in some embodiments includes a processing resource such as a microcontroller 240. Any of the processing resources described herein may be used and may operate to execute code that is either firmware or software code. Instructions 243 may include a IO device wireless communication polling and packet frame agent with data packet payload compression 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of a IO device wireless communication polling and packet frame agent with data packet payload compression 241, or other aspects or components.

The IO device wireless communication polling and packet frame agent with data packet payload compression 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the IO device wireless communication polling and packet frame agent with data packet payload compression 241 may operate in part as software or firmware instructions executed on the wireless IO device 280. The instructions 243 may embody one or more of the methods as described herein. For example, instructions relating to the IO device wireless communication polling and packet frame agent with data packet payload compression 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the IO device wireless communication polling and packet frame agent with data packet payload compression 241 may be stored in memory 286 on a computer-readable medium 242 such as a flash memory or magnetic disk in an example embodiment.

Figure 3:
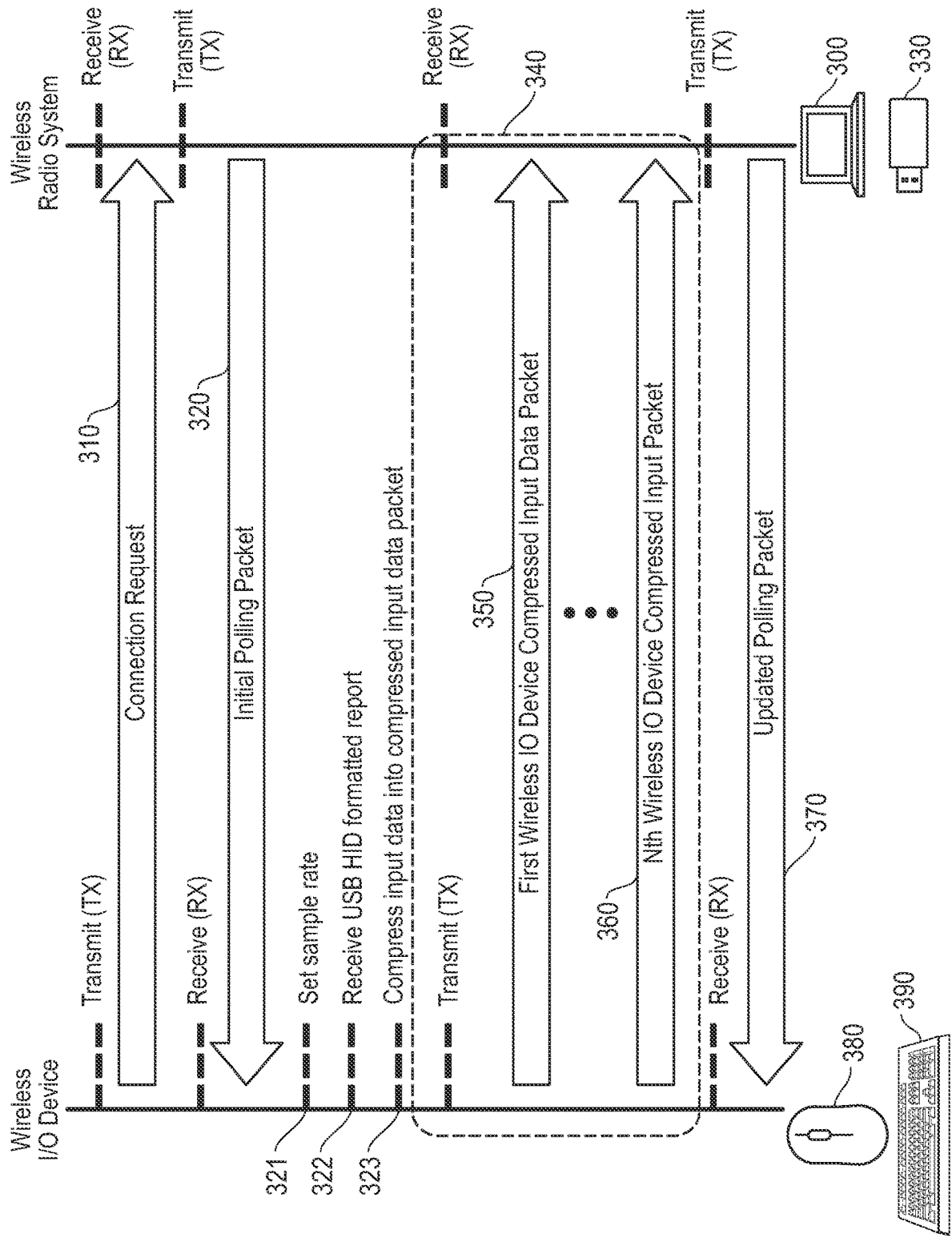
FIG. 3 is a block diagram illustrating a wireless IO device compressed input data packet communication frame orchestrated by the IO device wireless communication polling and packet frame system with data packet payload compression according to an embodiment of the present disclosure.

FIG. 3 is a block diagram illustrating generating a polling packet and a data packet communication frame for communication between a wireless communications dongle or integrated wireless radio system and a paired wireless input/output (IO) device orchestrated by a microcontroller of the wireless communications dongle or integrated wireless radio system. The microcontroller of the wireless communications dongle 330 or integrated wireless radio system of information handling system 300 executes code instructions of the IO device wireless communication polling and packet frame system with data packet payload compression according to an embodiment of the present disclosure. As described herein, the IO device wireless communication polling and packet frame system with data packet payload compression executing at an information handling system 300 or via a controller within a wireless communications dongle 330 operably connected to the information handling system 300 in an embodiment may schedule receipt of a plurality of data packets of a specified number from one or more paired wireless IO devices (e.g., mouse 380 or keyboard 390) between delivery of polling packets 320 and 370 that include an acknowledgement header (ACK) to each of those one or more paired wireless IO devices (e.g., mouse 380 or keyboard 390). For ease of explanation, the IO device wireless communication polling and packet frame system with data packet payload compression in various embodiments herein may be described as executing at the wireless communications dongle 330 in some embodiments herein. However, it is also contemplated that the IO device wireless communication polling and packet frame system with data packet payload compression may operate internally within an integrated wireless radio system of the information handling system 300 in an embodiment. Further, a IO device wireless communication polling and packet frame agent with data packet payload compression may operate at the wireless IO device (e.g., mouse 380 or keyboard 390) in various embodiments herein. In any such embodiments, the wireless communication dongle 330 or integrated wireless radio system is capable of establishing wireless links with the wireless IO device 380 according to the Bluetooth® or Bluetooth® Low Energy (BLE) communications protocols, or according to BLE radio layer protocol (e.g., BLE radio with Gaussian Frequency Shift Keying (GFSK) data modulation), as modified according to the wireless IO device communication protocol of embodiments herein.

In an embodiment, the wireless communications dongle 330 (or information handling system 300) may be placed within a receive (RX) mode. Within this RX mode, a wireless radio system of the wireless communications dongle 330 or the information handling system 300 may scan one or more frequencies at which wireless IO devices (e.g., 380) may be expected to transmit requests to communicate with the wireless communication dongle 330 or the information handling system 300. While in this RX mode, the wireless radio system of the wireless communications dongle 330 or the information handling system 300 may receive the request to connect 310 with the wireless communications dongle 330 or the information handling system 300. The wireless IO device 380 or 390 may be in a transmit mode and send a request to connect 310. This connection request 310 in some embodiments may include an identification of the model number or various default communication metrics (e.g., sample rate) for the mouse 380 or keyboard 390 or other identifying information for the mouse 380 or keyboard 390 or other IO devices that the wireless communications dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380 or keyboard 390 or other IO devices. As another example, the connection request 310 may include identification for the mouse 380 or keyboard 390 or other IO devices that is associated with a profile stored at the wireless communications dongle 330 or the information handling system 300 providing such sample rate, standard data packet transmission rate, or standard data packet transmission length.

Upon success of the connection requested, the wireless communications dongle 330 or the information handling system 300 may switch to a transmit (TX) mode. The wireless IO device 380 or 390 may switch to a receive (RX) mode. The controller of the wireless communications dongle 330 or the information handling system 300 integrated wireless radio system executing code instructions of the IO device wireless communication polling and packet frame system with data packet payload compression in an embodiment may generate an initial polling packet 320 that instructs each of the wireless IO devices (e.g., 380) paired with the wireless communications dongle 330 or the information handling system 300 to transmit a selected number of wireless IO device compressed input data packets of a selected compressed data packet length and at specified allotted time slots during a first data packet communication frame 340 between the wireless communications dongle 330 or the information handling system 300 and each of the paired wireless IO devices (e.g., 380) operatively coupled and having a request to connect 310.

The controller of the wireless communications dongle 330 or the information handling system 300 executing code instructions of the IO device wireless communication polling and packet frame system with data packet payload compression in an embodiment may select a number of compressed input data packets and a compressed data packet length, or wireless IO device allotted transmission time slots for receipt of wireless IO device compressed input data packets transmitted from that wireless IO device 380 based on default initial values that apply to the paired wireless IO device or to a wireless IO device 380 identifiable based on information given within the request to connect 310. For example, the controller of the wireless communications dongle 330 or the information handling system 300 executing code instructions of the IO device wireless communication polling and packet frame system with data packet payload compression may select a compressed input data packet number of five, a compressed input data packet length of 17 bytes (B), or wireless IO device allotted data packet transmission time slots, with each occurring every 0.000167 seconds (e.g., 167 µs) for receipt of wireless IO device compressed data packets transmitted from the wireless IO device 380 within a data packet communication frame 340 having a total length of 0.000833 seconds plus any delay or gap times included, or about 1,000 µs. The controller of the wireless communications dongle 330 or the information handling system 300 may instruct the wireless radio system to transmit an initial polling packet 320 containing the selected compressed input data packet number, the selected compressed input data packet length, and wireless IO device allotted data packet transmission time slots. This initial polling packet 320 in an embodiment may synchronize communication between the wireless communications dongle 330 or the information handling system 300 and the wireless IO device 380 for a data packet communication frame 340 beginning at a specified time and having the specified duration (e.g., 0.000833 seconds). Upon transmission of the initial polling packet 320 in an embodiment, the controller for the wireless communications dongle 330 or the information handling system 300 may switch the wireless radio system into a receive mode to await the beginning of the data packet communication frame 340 from the wireless IO device 380.

As described herein, such an orchestrated delivery of a selected number of wireless IO device compressed input data packets within the data packet communication frame 340 may allow for the transmission of a wireless IO device compressed input data up to every 0.000125 seconds (125 µs), or at a rate of 8,000 packets per second. Use of this orchestrated delivery method in an embodiment may allow the wireless IO device 380 to transmit input data (e.g., positional information from a mouse or registered keystrokes from a keyboard) at a high transmission rate, and also to register that input data within the wireless IO device 380 at a high sample rate. In other words, a wireless mouse (e.g., 380) may take positional measurements more frequently, or a keyboard (e.g., 390) may register keystrokes in smaller intervals.

Existing wireless IO devices transceive data packets adhering to the Universal Serial Bus (USB) Human Interface Device (HID) reporting formats for various types of devices that is not well-suited for these higher sample rates. For example, a wireless mouse (e.g., 380) may transceive positional information for the mouse (e.g., 380) according to the USB HID reporting format that requires the positional data to include an eight byte description of an initial position and an eight byte description of an adjusted position for the mouse. However, in embodiments of the present disclosure, positional data sampled in intervals less than 250-500 microseconds apart are expressed by providing the initial position, along with an offset change in position values away from this initial position. Such an offset change in position may be expressed in two bytes, in comparison to the eight bytes describing a newly adjusted next position value.

As another example, following the USB HID format for keyboard input information, a wireless keyboard (e.g., 390) may transceive keystroke information including six indicators for possible keystrokes, each comprising one byte of data. In other words, this format requires that each data packet reserve space to describe the user pressing six different keys, which becomes increasingly unlikely to occur as the sample rate for the keyboard 390 increases (e.g., a user is unlikely to press more than a few keys within a 1,000 microsecond data packet communication frame). The USB HID format for keyboards thus requires each data packet to include eight bytes of keystroke data, even if only a single keystroke is registered. Therefore, up to six bytes of data will be provided in a data packet indicating null values or the lack of a detected keystroke. Thus, transmission of wireless IO device input data in the USB HID format may result in transmission of larger wireless IO device input data packets than are necessary to communicate received input values to the information handling system 300 effectively when the wireless IO device (e.g., 380 or 390) is operating at a high sample rate afforded by the orchestrated transmission of data packets in an embodiment. These larger input data packet payloads may further lead to slower transmission rates and higher power consumption.

A controller of the wireless IO device (e.g., 380 or 390) executing code instructions of the IO device wireless communication polling and packet frame agent with data packet payload compression in an embodiment may address these issues by orchestrating compression of wireless IO device data, for position or keystrokes, into wireless IO device compressed input data payloads prior to transmission of those wireless IO device compressed input data packets. In an embodiment, the wireless IO device (e.g., mouse 380 or keyboard 390) that receives the initial polling packet 320 may use values from within the initial polling packet to set a sample rate at 321 at which the wireless IO device (e.g., mouse 380 or keyboard 390) takes input (e.g., measures position of the mouse or registers keystrokes) as wireless IO device input data. For example, in an embodiment in which the initial polling packet 320 instructs delivery of a wireless IO device compressed input data packet within wireless IO device allotted time slots occurring every 125 μs (e.g., to give a transmission rate of 8,000 packets per second), the wireless IO device may set its sample rate to 125 us or less. In the case of a mouse, this indicates positional measurements taken every 125 μs, and in the case of a keyboard, this indicates detection of keypresses every 125 μs.

At 322, the wireless IO device (e.g., mouse 380 or keyboard 390) may begin to receive input data (e.g., positional measurements for the mouse 380, or registered keystrokes for the keyboard 390) in the form of Universal Serial Bus (USB) human interface device (HID) formatted reports. This is done since the USB HID formatted wireless IO device input data is to be delivered to the OS of the information handling system 300 in this format. As described herein, existing wireless IO devices transceive data packets adhering to the Universal Serial Bus (USB) Human Interface Device (HID) reporting formats for various types of devices, but such a format is inefficient and is not well-suited for higher sample rates. Setting of such a high sample rate or selection within the initial polling packet 320 of a shorter wireless IO device compressed input data packet length in an embodiment may prompt a controller executing code instructions of a IO device wireless communication polling and packet frame agent with data packet payload compression at the wireless IO device (e.g., mouse 380 or keyboard 390) to compress the wireless IO device input data detected at the wireless IO device at 323 prior to transmission of that wireless IO device input data as a payload of a wireless IO device compressed input data packet (e.g., 350 to 360) to the wireless communication dongle 330 or information handling system 300 in data packet communication frame 340.

The controller of the wireless IO device (e.g., mouse 380 or keyboard 390) in an embodiment may include a portion of the data usually included in data packets adhering to the USB HID format requirements described above, such as an initial position value or an actual keystroke value, and then use an abbreviated set of data for remaining data bytes normally in the USB HID format in order to decrease the payload of the wireless IO device compressed input data packets (e.g., 350 to 360) transceived. For example, as described herein, positional data sampled in intervals less than 250-500 microseconds apart by a wireless mouse 380 may be expressed by providing the initial position value in a first set of data packets at 8 bytes and offset change in position value away from this initial position in subsequent data bytes at 2 bytes and in subsequent data packets from the wireless mouse 380. The offset change in position value away from this initial position in subsequent data bytes at 2 bytes replaces providing the initial position at 8 bytes and position data again for each next adjusted position at 8 bytes for each adjusted position. In embodiments in which a wireless mouse 380 has set a sample rate to less than 250-500 microseconds between positional measurements, or in which the initial polling packet 320 instructs transmission of packets in intervals less than 250-500 microseconds apart, the controller for the wireless mouse 380 may express positional measurements in each of such wireless IO device compressed input data packets (e.g., 350 to 360) as an initial position plus an offset change or offset in position away from that initial position for all subsequent positions until the compression ends. This compressed expression of positional measurement may decrease the size of the wireless IO device compressed input data packets (e.g., 350 to 360) containing this compressed positional measurement for subsequent positions after the initial position by up to six bytes for each position report in comparison to the size of a wireless IO device input data packet containing repeated new positional measurements adhering to the USB HID format.

As another example, as described herein, the USB HID format for keyboards requires that each data packet reserve space to describe the user pressing six different keys, which becomes increasingly unlikely to occur as the sample rate for the keyboard 390 increases (e.g., a user is unlikely to press more than a few keys within a 1,000 microsecond data packet communication frame 340). In embodiments in which a wireless keyboard 390 has set a sample rate to less than 250-500 microseconds between registering of keystrokes, or in which the initial polling packet 320 instructs transmission of packets in intervals less than 250-500 microseconds apart, the controller for the wireless keyboard 390 may omit any null data (indicating no keys pressed) to truncate the wireless IO device input data in each of such wireless IO device compressed input data packets (e.g., 350 to 360). This compressed expression of keypresses may decrease the size of the wireless IO device compressed input data packets (e.g., 350 to 360) containing only registered keystrokes by up to six bytes in comparison to the eight byte required size of a payload for a wireless IO device input data packet containing each new set of keystrokes, often one keystroke, adhering to the USB HID format. Wireless IO device 380 or 390 may enter transmit mode to transmit the specified number of wireless IO device compressed input data packets of specified packet length in a data packet communication frame 340.

At the time specified within the initial polling packet 320 in an embodiment, the data packet communication frame 340 may begin with receipt of a first wireless IO device compressed input data packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a length equivalent to the wireless IO device compressed input data packet length of 17 Bytes and may be delivered at the synchronized time designating the beginning of the data packet communication frame 340 within the first of five wireless IO device allotted data packet transmission time slots, as defined within the initial polling packet 320.

A microcontroller executing code instructions of the IO device wireless communication polling and packet frame system with data packet payload compression at the wireless communications dongle 330 or the information handling system 300 may ensure that, during this data packet communication frame 340, the wireless radio system remains in a receive mode to receive wireless IO device compressed input data packets (e.g., 350 to 360) from the one or more paired wireless IO devices (e.g., 380 or 390) during the anticipated duration of the data packet communication frame 340. In other words, the controller of the wireless communications dongle 330 or the information handling system 300 may avoid any power loss or data rate transmission delay due to rapid switching between RX/TX modes during this data packet communication frame 340. During the data packet communication frame 340 in an embodiment, the wireless radio system of the wireless communication dongle 330 or the information handling system 300 may receive a plurality of wireless IO device compressed input data packets (e.g., 350 to 360) equivalent to the selected wireless IO device compressed input data packet number as defined within the initial polling packet 320. For example, in an embodiment in which the initial polling packet 320 identified an wireless IO device compressed input data packet number of five, the Nth packet 360 received by the wireless radio system of the wireless communication dongle 330 or the information handling system 300 may be the fifth of five data packets transmitted during the data packet communication frame 340 from the wireless IO device 380 or 390 to the wireless communication dongle 330 or the information handling system 300. Each of the five data packets transmitted to the wireless communication dongle 330 or the information handling system 300 in an embodiment may have the selected wireless IO device compressed input data packet number and selected wireless IO device compressed input data packet length and may be transmitted at the designated wireless IO device allotted data packet transmission time slots identified within the initial polling packet 320.

Upon receipt of the wireless IO device compressed input data packets 350-360 in the data packet communication frame 340, the wireless communication dongle 330 or internal wireless adapter of the information handling system shall determine, from a header which wireless IO device has transmitted which wireless IO device compressed input data packets in the data packet communication frame 340. Depending on the wireless IO device identified for the wireless IO device compressed input data packets, the microcontroller of the wireless communication dongle 330 or wireless adapter of the information handling system will execute code instructions of the IO device wireless communication polling and packet frame system with data packet payload compression to regenerate the USB HID format wireless IO device input data from the received wireless IO device compressed input data packets 350-360 according to embodiments herein. This USB HID format wireless IO device input data for may then be provided to the OS of the information handling system 300 for use with IO device drivers, the display device, the OS, and software applications executing therein.

Following the data packet communication frame 340, the controller of the wireless communications dongle 330 or the information handling system 300 may switch the wireless radio system to a transmit mode for further synchronizing future data packet communication frames and also acknowledging receipt or missed packets from a previous data packet communication frame. The controller may execute code instructions of the IO device wireless communication polling and packet frame system with data packet payload compression in an embodiment to generate and transmit an updated polling packet 370. In an embodiment, such an updated polling packet 370 may include an acknowledgement header (ACK) identifying the number (N) of packets received during the data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five packets.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame. In such an embodiment, the updated polling packet 370 may or may not further adjust one or more of the selected wireless IO device compressed input data packet number, selected wireless IO device compressed input data packet length, or wireless IO device allotted data packet transmission time slots for the wireless IO device 380 or 390. For example, in an embodiment, the updated polling packet 370 identifying an updated time for initiation of a second, later data packet communication frame may also provide an updated selected wireless IO device compressed input data packet number equivalent to the initial selected wireless IO device compressed input data packet number. In another example, in an embodiment, the updated polling packet 370 may also provide an updated selected wireless IO device compressed input data packet length equivalent to the initial selected wireless IO device compressed input data packet length. In still another example, in an embodiment, the updated polling packet 370 may also provide updated wireless IO device allotted data packet time slots having the same positions within the second data packet communication frame as the positions of the initial wireless IO device allotted data packet transmission time slots within the first data packet communication frame 340.

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication dongle 330 or information handling system 300 and minimize the frequency with which switches between TX mode and RX mode are required. In such a way, the IO device wireless communication polling and packet frame system with data packet payload compression may decrease the frequency of ACK data packets transmitted, and the frequency of mode-switching described above with respect to existing systems. This may decrease power consumed by rapid mode-switching, reduce latency and improve overall user experience and wireless IO device (e.g., 380 or 390) performance.

In a further aspect of an embodiment, the controller of the wireless communication dongle 330 or the information handling system 300 executing code instructions of the IO device wireless communication polling and packet frame system with data packet payload compression in an embodiment may determine that the wireless IO device 380 or 390 has failed to transmit a number of data packets equivalent to the initial allotted data packet number within the initial polling packet 320. This may occur, for example, if the wireless IO device 380 or 390 powers down or enters sleep mode during the data packet communication frame 340 from lack of use. In such a scenario, the controller of the wireless communication dongle 330 or the information handling system 300 executing code instructions of the IO device wireless communication polling and packet frame system with data packet payload compression in an embodiment may initiate a device responsiveness timer having a preset duration (e.g., two minutes, five minutes, ten minutes). If no further data packets are received from the wireless IO device 380 or 390 before the device responsiveness timer expires, this may indicate that the wireless IO device 380 or 390 has been powered down or entered a sleep mode. In such a case, the controller of the wireless communication dongle 330 or the information handling system 300 executing code instructions of the IO device wireless communication polling and packet frame system with data packet payload compression in an embodiment may terminate the wireless link with the wireless IO device 380 or 390 and return to the RX mode to scan multiple frequencies for incoming requests from other wireless IO devices to pair with the wireless communication dongle 330 or the information handling system 300.

Figure 4:
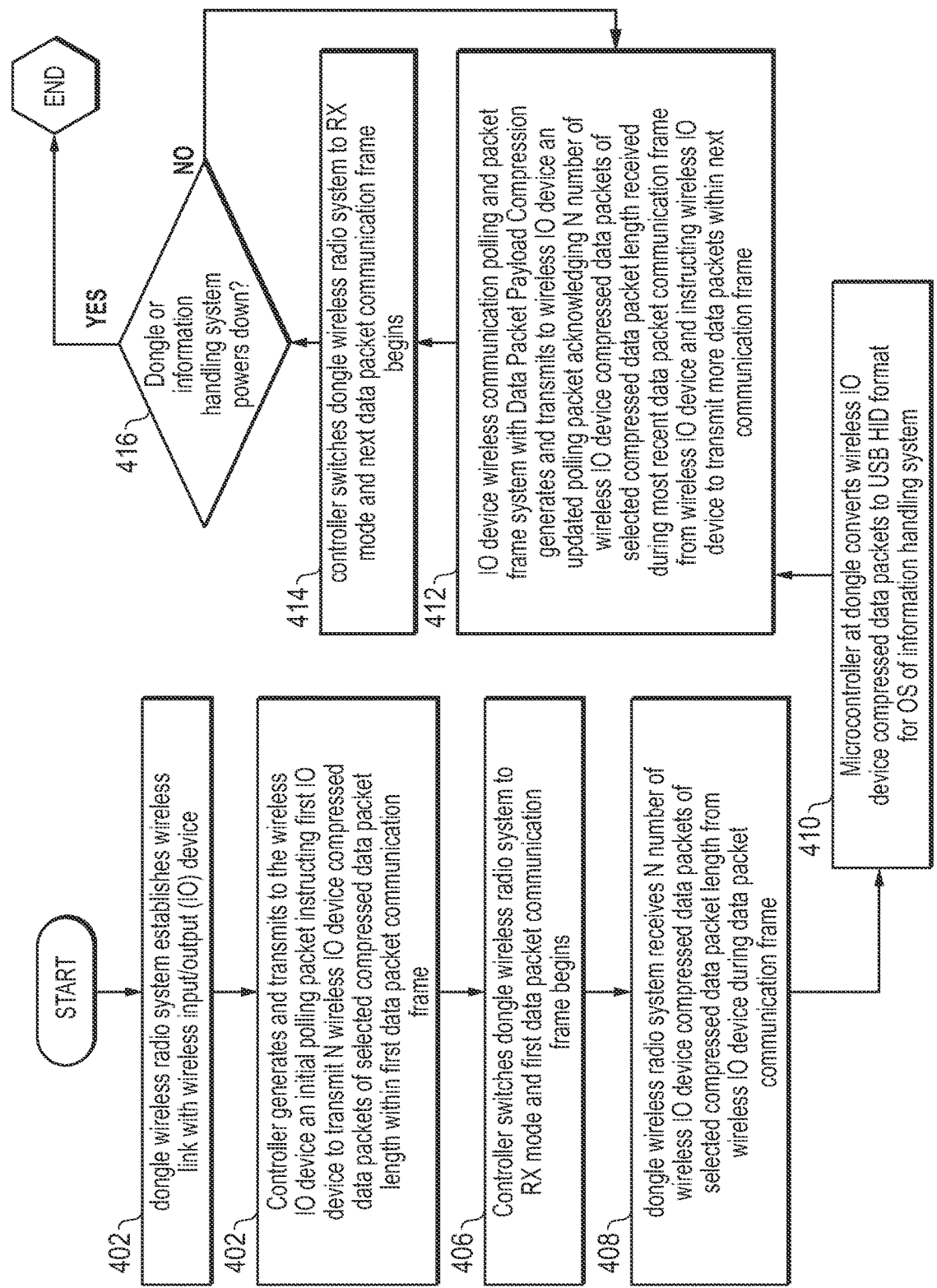
FIG. 4 is a flow diagram illustrating a method of orchestrating transmission of wireless IO device compressed input data packets from one or more wireless IO devices to a wireless communication dongle according to an embodiment of the present disclosure.

FIG. 4 is a flow diagram illustrating a method of orchestrating transmission of wireless IO device compressed input data packets from one or more wireless IO devices to a wireless communication dongle during a data packet communication frame to decrease power consumption, and increase data transmission rates according to an embodiment of the present disclosure. As described herein, embodiments of the present disclosure employ a customized wireless IO device communication protocol by performing data modulation on wireless IO device data packets transceived using the BLE radio layer protocol in order to allow for transmission of a plurality of data packets from the wireless IO device to the wireless radio system between ACK of received data packets transmitted in the polling packets from the wireless radio system to the wireless IO device. A controller for a wireless radio system of a wireless communication dongle or information handling system may orchestrate scheduled delivery of a plurality of data packets from each of one or more wireless IO devices in a data packet communication frame between delivery of ACK in the polling packets to each of one or more wireless IO devices. The polling packet also instructs each of the wireless IO devices to transmit a selected number of wireless IO device compressed input data packets of a selected wireless IO device compressed input data packet length at allotted wireless IO device time slots of a data packet communication frame.

The controller at the wireless communications dongle may ensure that, during this data packet communication frame in which time slots have been allocated to the one or more wireless IO devices (e.g., mouse and headset), the wireless radio system, such as in the wireless communication dongle, remains in a receive mode to receive a plurality of wireless IO device input data packets from the one or more paired wireless IO devices in accordance with the number of packets prescribed and the duration (e.g., based on packet lengths) from each of the one or more wireless IO devices. Such an orchestrated delivery of a plurality of wireless IO device compressed input data packets within the data packet communication frame may allow for the transmission of a wireless IO device input data packet up to every 0.000125 seconds (125 µs), or at a rate of 8,000 packets per second. Use of this orchestrated delivery method and compressed wireless IO data input packets in embodiments of the present disclosure may allow the wireless IO device to transmit input data (e.g., positional information from a mouse or registered keystrokes from a keyboard) at a high transmission rate, and also to register that input data within the wireless IO device at a high sample rate. In other words, a wireless mouse may take positional measurements more frequently, or a keyboard may register keystrokes in smaller intervals.

At block 402, a controller for a wireless communication dongle or a network interface device for an information handling system may establish a wireless link with a wireless input/output (IO) device in an embodiment. For example, in an embodiment described with respect to FIG. 3, a wireless radio system of the wireless communications dongle 330 or the information handling system 300 may scan one or more frequencies at which wireless IO devices (e.g., 380 or 390) may be expected to transmit requests to connect with the dongle 330 or the information handling system 300. The wireless radio system of the wireless communications dongle 330 or the information handling system 300 may receive a request to connect 310 with the wireless communications dongle 330 or the information handling system 300. This connection request 310 in some embodiments may include an identification of the model number or various default communication metrics for the mouse 380 or keyboard 390 or other identifying information for the mouse 380 or keyboard 390 that the wireless communications dongle 330 or the information handling system 300 may use to access stored information identifying such default communications metrics (e.g., sample rates). For example, the connection request 310 may include a standard data packet transmission rate (e.g., 6,000 packets per second), or standard data packet transmission length (e.g., 17, 23 bytes or 184 bits) for the mouse 380 or keyboard 390. As another example, the connection request 310 may include identification for the mouse 380 or keyboard 390 that is associated with a profile stored at the wireless communications dongle 330 or the information handling system 300 providing such standard data packet transmission rate, sample rate, or standard data packet transmission length or capabilities of the mouse for data throughput levels.

At block 404, the controller of the wireless communication dongle or the information handling system may switch the wireless radio system to a transmit (TX) mode for transmission of an initial polling packet for synchronizing delivery of data packets between the wireless IO device and the wireless communication dongle or information handling system. The initial polling packet may also include an instruction to execute wireless IO device input data compression in some embodiments for a particular wireless IO device. For example, upon successful establishment of the wireless link at block 402 above, the wireless communications dongle 330 or the information handling system 300 may switch to a transmit (TX) mode. The controller of the wireless communications dongle 330 or the information handling system 300 executing code instructions of the IO device wireless communication polling and packet frame system with data packet payload compression in an embodiment may generate an initial polling packet 320 that instructs each of the wireless IO devices (e.g., 380 or 390) paired with the wireless communications dongle 330 or the information handling system 300 to transmit a selected number of wireless IO device compressed input data packets of a selected compressed data packet length and at specified wireless IO device allotted time slots during a first data packet communication frame 340 between the wireless communications dongle 330 or the information handling system 300 and each of the paired wireless IO devices (e.g., 380). The compression used may be distinguished by the type of wireless IO device identified in the header of transmitting the wireless IO device compressed input data packets.

The controller of the wireless communications dongle 330 or the information handling system 300 executing code instructions of the IO device wireless communication polling and packet frame system with data packet payload compression in an embodiment may select a number of compressed input data packets and a compressed data packet length, or wireless IO device allotted transmission time slots for receipt of wireless IO device compressed input data packets transmitted from the wireless IO device 380 based on default initial values that apply to the paired wireless IO device or to a wireless IO device 380 identifiable based on information given within the request to connect as well as any wireless IO device input data compression used. For example, the controller of the wireless communications dongle 330 or the information handling system 300 executing code instructions of the IO device wireless communication polling and packet frame system with data packet payload compression may select a compressed input data packet number of five, a compressed input data packet length of 17 bytes (B), or wireless IO device allotted data packet transmission time slots, with each occurring every 0.000167 seconds (e.g., 167 μs) for receipt of wireless IO device compressed data packets transmitted from the wireless IO device 380 within a data packet communication frame 340 having a total length of 0.000833 seconds plus any delay or gap times included, or about 1,000 μs. The controller of the wireless communications dongle 330 or the information handling system 300 may instruct the wireless radio system to transmit an initial polling packet 320 containing the selected compressed input data packet number, the selected compressed input data packet length, and wireless IO device allotted data packet transmission time slots. This initial polling packet 320 in an embodiment may synchronize communication between the wireless communications dongle 330 or the information handling system 300 and the wireless IO device 380 for a data packet communication frame 340 beginning at a specified time and having the specified duration (e.g., 0.000833 seconds). The compression may depend on the type of wireless IO device. For example, a wireless mouse 380 may transmit an initial position data value followed by subsequent offset change in position values relative to the initial position value to reduce the subsequent position values to two bytes from eight bytes in one embodiment. In another embodiment, a wireless keyboard 390 may transmit only actual keystrokes at one byte per actual keystroke and truncate keyboard input data bytes from other null values where no keystrokes were received. Upon transmission of the initial polling packet 320 in an embodiment, the controller for the wireless communications dongle 330 or the information handling system 300 may switch the wireless radio system into a receive mode to await the beginning of the data packet communication frame 340 from the wireless IO device 380.

As described herein, such an orchestrated delivery of a plurality of wireless IO device compressed input data packets within the data packet communication frame 340 may allow for the transmission of a wireless IO device compressed input data up to every 0.000125 seconds (125 μs), or at a rate of 8,000 packets per second. Use of this orchestrated delivery method in an embodiment may allow the wireless IO device 380 to transmit input data (e.g., positional information from a mouse or registered keystrokes from a keyboard) at a high transmission rate, and also to register that input data within the wireless IO device 380 at a high sample rate. In other words, a wireless mouse (e.g., 380) may take positional measurements more frequently, or a keyboard (e.g., 390) may register keystrokes in smaller intervals.

At block 406, the controller for the wireless communication dongle may switch the wireless radio system to a receive (RX) mode and the first data packet communication frame may begin in an embodiment. Upon transmission of the initial polling packet 320 in an embodiment, the controller for the wireless communications dongle 330 or the information handling system 300 may switch the wireless radio system into a receive mode to await the beginning of the data packet communication frame 340 from the wireless IO device 380. As described herein, such an orchestrated delivery of a plurality of wireless IO device compressed input data packets within the data packet communication frame 340 may allow for the transmission of a wireless IO device compressed input data up to every 0.000125 seconds (125 μs), or at a rate of 8,000 packets per second. Use of this orchestrated delivery method in an embodiment may allow the wireless IO device 380 to transmit input data (e.g., positional information from a mouse or registered keystrokes from a keyboard) at a high transmission rate, and also to register that input data within the wireless IO device 380 at a high sample rate. In other words, a wireless mouse (e.g., 380) may take positional measurements more frequently, or a keyboard (e.g., 390) may register keystrokes in smaller intervals.

This high frequency of sample rate and data packet transmission may allow the wireless IO device (e.g., 380 or 390) to accurately convey measured or detected input data (e.g., positional measurements for the mouse or keystrokes for the keyboard) using less information wirelessly transmitted and consequently smaller data packets than in existing systems that transmit such information in accordance with the Universal Serial Bus (USB) human interface device (HID) formatting requirements. As a consequence, the first data packet communication frame 340 may include transmission of wireless IO device compressed input data packets having payloads of compressed or truncated input data measured or detected at the wireless IO device (e.g., 380 or 390)

The dongle wireless radio system in an embodiment at block 408 may receive the selected number of wireless IO device compressed data packets during the data packet communication frame. Upon transmission of the initial polling packet 320 in an embodiment, the controller for the wireless communications dongle 330 or the information handling system 300 may switch the wireless radio system into a receive mode to await the beginning of the data packet communication frame 340 with the wireless IO device 380 or 390. At the time specified within the initial polling packet 320 in an embodiment, the data packet communication frame 340 may begin with receipt of a first wireless IO device compressed input data packet 350 responsive to the initial polling packet 320 from the wireless IO device 380. In an embodiment, the first wireless IO device compressed input data packet 350 for the data packet communication frame 340 may adhere to the instructions received within the initial polling packet 320. For example, in an embodiment, the first wireless IO device compressed input data packet 350 may have a length equivalent to the selected wireless IO device compressed input data packet length of 17 bytes and may be delivered at the synchronized time designating the beginning of the data packet communication frame 340 within the first of five initial wireless IO device allotted data packet transmission time slots, as defined within the initial polling packet 320.

During the data packet communication frame 340 in an embodiment, the wireless radio system of the wireless communication dongle 330 or the information handling system 300 may receive a plurality of wireless IO device compressed input data packets equivalent to the selected wireless IO device compressed input data packet number, as defined within the initial polling packet 320. More specifically, in an embodiment in which the initial polling packet 320 identified an initial allotted data packet number of N=five, the Nth packet 360 received by the wireless radio system of the wireless communication dongle 330 or the information handling system 300 may be the fifth of five wireless IO device compressed input data packets transmitted during the data packet communication frame 340 from the wireless IO device 380 or 390 to the wireless communication dongle 330 or the information handling system 300.

At block 410, the microcontroller at the wireless communication dongle or internal wireless adapter converts the received wireless IO device compressed input data packets to wireless IO device input data in regular USB HID format. As described further in embodiments herein, the microcontroller executing code instructions of the IO device wireless communication polling and packet frame system with data packet payload compression to determine for each received wireless IO device compressed input data packets which wireless IO device, such as 380 or 390, transmitted the wireless IO device compressed input data packet. This may be determined from header information on the wireless IO device compressed input data packet identifying which wireless IO device transmitted it or from the allotted time slot on which the wireless IO device compressed input data packet was received in various embodiments. Then the received wireless IO device compressed input data packets may be regenerated into data bytes of wireless IO input data in the USB HID format by the controller of the wireless communication dongle 330 or wireless adapter executing the IO device wireless communication polling and packet frame system. The wireless input data in the USB HID format is then transferred to the OS of the information handling system 300 and its IO device drivers for use with the display images on a display device as well as with executing software applications and other IO inputs in various embodiments.

At block 412, the data packet communication frame orchestrated according to the initial polling packet transmitted at block 404 may end and the controller for the wireless communication dongle or information handling system may switch the dongle wireless radio system to the TX mode for transmission of an updated polling packet in an embodiment. For example, in an embodiment described with reference to FIG. 3, following the data packet communication frame 340 and time or number of packets allocated for the same, the controller of the wireless communications dongle 330 or the information handling system 300 may switch the wireless radio system to a TX mode for orchestrating a future data packet communication frame.

The controller for the wireless communication dongle or information handling system in an embodiment may generate an updated polling packet 370 acknowledging the number of packets received during the previous data packet communication frame to each paired wireless IO device (e.g., 380 or 390). In an embodiment, such an updated polling packet 370 may include an acknowledgement header (ACK) identifying the number of packets received during the previous data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five wireless IO device compressed input data packets. The updated polling packet 370 in an embodiment may further include updated instructions for synchronizing transmission of data packets within a second, later data packet communication frame. For example, the updated polling packet 370 may provide an updated time for initiation of such a second, later data packet communication frame for N packets again. The wireless communication dongle 330 or the information handling system 300 in an embodiment may execute code instructions of the IO device wireless communication polling and packet frame system with data packet payload compression to instruct the wireless radio system to transmit the updated polling packet 370.

At block 414, one or more wireless IO devices may communicate with the wireless communication dongle during one or more data packet communication frames, according to the instructions given within the updated polling packet transmitted at block 412. For example, at the time specified within the updated polling packet 370 in an embodiment, a second data packet communication frame may begin between the wireless IO device (e.g., 380 or 390) and the wireless radio system of the wireless communication dongle 330 or information handling system 300.

The controller of the wireless communication dongle or the information handling system in an embodiment at block 416 may determine whether the dongle or the information handling system has powered down. If the wireless communication dongle or the information handling system has powered down in an embodiment, there may be no need or no capability to switch the dongle wireless radio system to a RX mode for further communication with the IO device, and the method may then end. If the wireless communication dongle or the information handling system has not powered down in an embodiment, the method may proceed to block 410 to generate and transmit a further updated polling packet acknowledging receipt of wireless IO device compressed input data packets during the second wireless communication data frame. By repeating the loop between blocks 412 and 416, the IO device wireless communication polling and packet frame system with data packet payload compression may decrease the frequency of ACK data packets transmitted by the wireless communication dongle or information handling system, and the frequency of mode-switching described above with respect to existing systems. This may further decrease power consumed by rapid mode-switching, decrease latency, and improve overall wireless IO device throughput and user experience. It may also allow the wireless IO device to transmit input data (e.g., positional information from a mouse or registered keystrokes from a keyboard) at a high transmission rate, and also to register that input data within the wireless IO device at a high sample rate.

Figure 5:
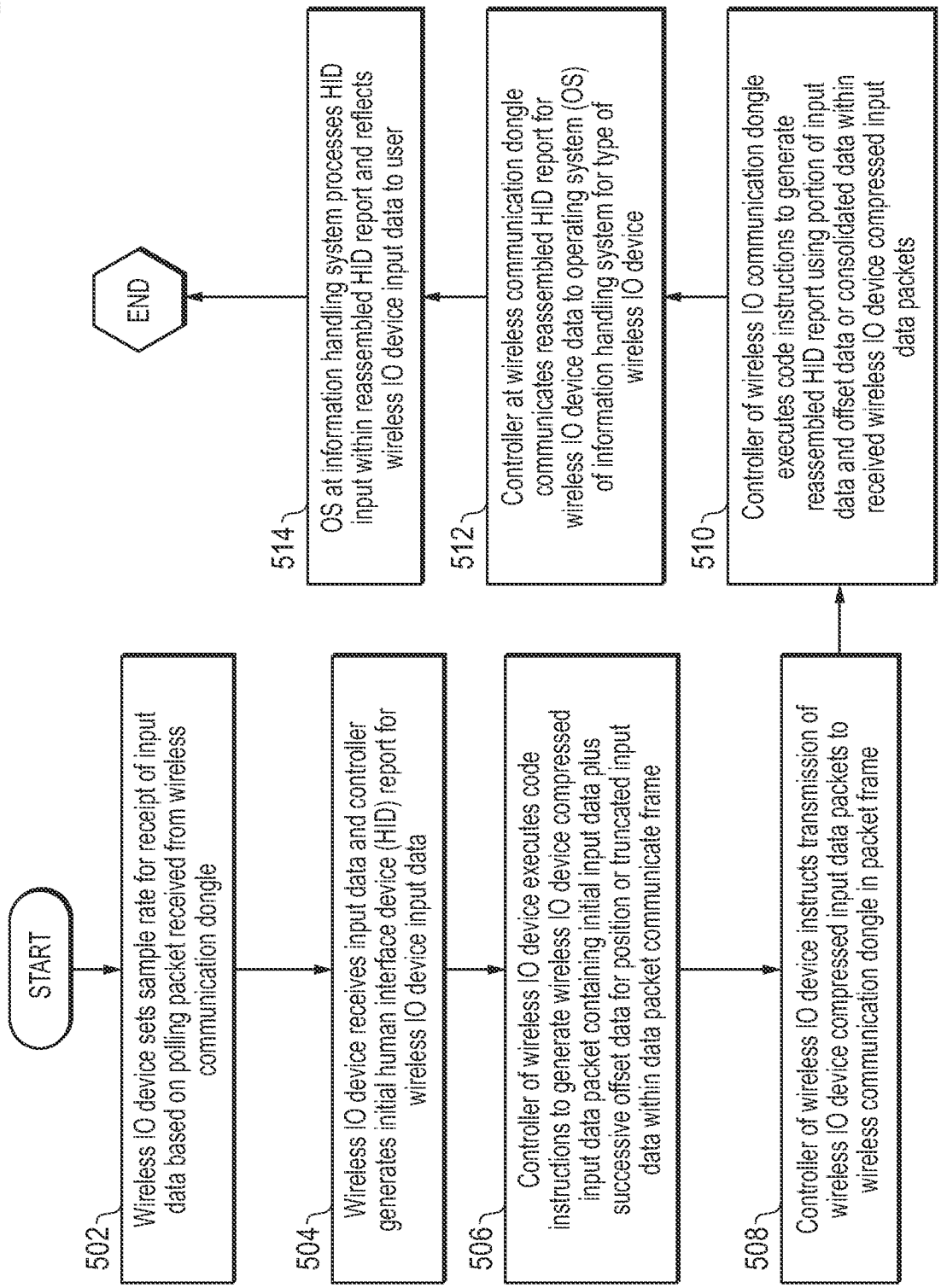
FIG. 5 is a flow diagram illustrating a method of compressing and decompressing wireless IO device input data packet payloads prior to and following transmission between a wireless IO device and a wireless communication dongle via an IO device wireless communication polling and packet frame system with data packet payload compression according to an embodiment of the present disclosure.

FIG. 5 is a flow diagram illustrating a method of compressing and decompressing wireless input/output (IO) device input data packet payloads prior to and following transmission between a wireless IO device and a wireless communication dongle, respectively, to decrease power consumption, and increase data transmission rates according to an embodiment of the present disclosure. As described herein, existing wireless IO devices transceive data packets adhering to the Universal Serial Bus (USB) Human Interface Device (HID) reporting formats for various types of devices. However, these USB HID reporting formats are not well-suited for wireless transmission while trying to maintain the higher sample rates afforded through the use of the data packet transmission orchestration method of the wireless IO device communication protocol described above with respect to FIG. 4. Thus, transmission of wireless IO device input data in the USB HID format may result in wireless transmission of larger wireless IO device input data packets than are necessary to communicate received input values to the information handling system effectively when the wireless IO device is operating at a high sample rate afforded by the orchestrated transmission of data packets in embodiments of the present disclosure. These larger input data packet payloads may further lead to slower transmission rates and higher power consumption. The IO device wireless communication polling and packet frame system with data packet payload compression in an embodiment may address these issues by orchestrating compression of wireless IO device input data packet payloads prior to transmission of those wireless IO device compressed input data packets and decompression of the payload from the wireless IO device compressed input data packets at a communication dongle or wireless radio of an information handling system.

At block 502, a wireless IO device in an embodiment may set a sample rate for receipt of input data based on information within a polling packet received from a wireless communication dongle. For example, in an embodiment described with respect to FIG. 3, the wireless IO device (e.g., mouse 380 or keyboard 390) that receives the initial polling packet 320 may use values from within the initial polling packet to set a sample rate at 321 at which the wireless IO device (e.g., mouse 380 or keyboard 390) takes input (e.g., measures position of the mouse or registers keystrokes). More specifically, in an embodiment in which the initial polling packet 320 instructs delivery of a wireless IO device compressed input data packet within wireless IO device allotted time slots occurring every 125 µs (e.g., to give a transmission rate of 8,000 packets per second), the wireless IO device may set its sample rate to 125 µs or less. In the case of a mouse, this indicates positional measurements taken every 125 µs, and in the case of a keyboard, this indicates detection of keypresses every 125 µs.

The wireless IO device in an embodiment at block 504 may receive input data and the controller for the wireless IO device may generate an initial HID formatted report of the wireless IO device input data. For example, in an embodiment described at 322 of FIG. 3, the wireless IO device (e.g., mouse 380 or keyboard 390) may begin to receive input data (e.g., positional measurements for the mouse 380, or registered keystrokes for the keyboard 390) in the form of USB HID formatted reports. In another embodiment described with reference to FIG. 2, a wireless mouse (e.g., 280) may transceive positional information for the mouse (e.g., 280) according to the USB HID reporting format that requires the positional data to include an eight byte description of an initial position and an eight byte description of each subsequent adjusted position for the mouse. However, positional data sampled in intervals less than 250-500 microseconds apart may be expressed by providing the initial position, along with an offset change in position value away from this initial position according to embodiments herein. Such an offset change in position value may be expressed in two bytes, in comparison to the eight bytes describing an adjusted position. The IO device wireless communication polling and packet frame system with data packet payload compression in an embodiment generates compression of wireless IO device input data packet payloads with the offset change in position values for subsequent adjusted positions after the initial position data. This yields a compressed IO device input data packet for subsequent position data that may be transmitted in a data packet communication frame according to an embodiment herein for a wireless mouse, wireless touchpad, or wireless gaming controller or other system with positional input data.

In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. Following the USB HID format for keyboard input information, a wireless keyboard (e.g., 280) may transceive keystroke information including six indicators for possible keystrokes, each comprising one byte of data. In other words, this format requires that each data packet reserve space to describe the user pressing six different keys, which becomes increasingly unlikely to occur as the sample rate for the keyboard (e.g., 280) increases (e.g., a user is unlikely to press more than a few keys within a 1.000 microsecond data packet communication frame). The USB HID format for keyboards thus requires each data packet to include six bytes of keystroke data, even if only a single keystroke is registered, resulting in five bytes of data indicating null values, or the lack of a detected keystroke. Thus, transmission of wireless IO device input data in the USB HID format may result in transmission of larger wireless IO device input data packets than are necessary to communicate received input values to the wireless communication adapter/dongle 230 effectively when the wireless IO device is operating at a high sample rate afforded by the orchestrated transmission of data packets in embodiments of the present disclosure. These larger input data packet payloads may further lead to slower transmission rates and higher power consumption. Accordingly, the IO device wireless communication polling and packet frame system with data packet payload compression in an embodiment generates compression of wireless IO device input data packet payloads with truncated data packets shedding null value packets and transmitting actual keystroke values. This yields a compressed IO device input data packet for keystroke data that may be transmitted in a data packet communication frame according to an embodiment herein for a wireless keyboard.

At block 506, the controller of the wireless IO device may execute code instructions of the IO device wireless communication polling and packet frame agent with data packet payload compression to generate wireless IO device compressed input data packets containing the wireless IO device input data compressed from the initial HID report format as described in embodiment herein. As described herein in an embodiment with respect to FIG. 3, existing wireless IO devices transceive data packets adhering to the USB HID reporting formats for various types of devices that is not well-suited for higher sample rates. Setting of such a high sample rate or selection within the initial polling packet 320 of a shorter wireless IO device compressed input data packet length in an embodiment may prompt a controller executing code instructions of a IO device wireless communication polling and packet frame agent with data packet payload compression at the wireless IO device (e.g., mouse 380 or keyboard 390) to compress the wireless IO device input data detected at the wireless IO device at 323 prior to transmission of that wireless IO device input data as a payload of a wireless IO device compressed input data packet (e.g., 350 to 360) to the wireless communication dongle 330 or information handling system 300.

The controller of the wireless IO device (e.g., mouse 380 or keyboard 390) in an embodiment may include a portion of the data usually included in data packets adhering to the USB HID format requirements described above, such as an initial position value for position data or a keystroke value for an actual received keystroke input. In order to decrease the payload of the wireless IO device compressed input data packets (e.g., 350 to 360) transceived, however, the IO device wireless communication polling and packet frame agent with data packet payload compression at the wireless IO device adds a header in some embodiments describing the type of wireless IO device an implements compression for that type of wireless IO device. The compression utilized includes the compression to the input data packets including using offset change in position values for subsequent adjusted position data or using the truncated keystroke input data to truncate data bytes that would only contain null values from actual keystroke input data values in example embodiments.

For example, as described herein, positional data sampled in intervals less than 250-500 microseconds apart may be expressed by providing the initial position, along with a offset change in position value away from this initial position in subsequent position input data, rather than providing the initial position at 8 bytes and each subsequent adjusted position at 8 bytes. In embodiments in which a wireless mouse 380 has set a sample rate to less than 250-500 microseconds between positional measurements, or in which the initial polling packet 320 instructs transmission of packets in intervals less than 250-500 microseconds apart, the controller for the wireless mouse 380 may express positional measurements in each of such wireless IO device compressed input data packets (e.g., 350 to 360) as an initial position and an offset change or offset in position value away from that initial position. This compressed expression of positional measurement may decrease the size of the wireless IO device compressed input data packets (e.g., 350 to 360) containing this compressed positional measurement by six bytes in comparison to the size of a wireless IO device input data packet containing positional measurement adhering to the USB HID format.

As another example, as described herein, the USB HID format for keyboards requires that each data packet reserve space to describe the user pressing six different keys, which becomes increasingly unlikely to occur as the sample rate for the keyboard 390 increases (e.g., a user is unlikely to press more than a few keys within a 1,000 microsecond data packet communication frame 340). In embodiments in which a wireless keyboard 390 has set a sample rate to less than 250-500 microseconds between registering of keystrokes, or in which the initial polling packet 320 instructs transmission of packets in intervals less than 250-500 microseconds apart, the controller for the wireless keyboard 390 may omit any null data (indicating no keys pressed) to truncate keystroke input data bytes in each of such wireless IO device compressed input data packets (e.g., 350 to 360). This compressed or truncated expression of keypresses may decrease the size of the wireless IO device compressed input data packets (e.g., 350 to 360) containing only registered actual keystrokes by up to six bytes. This reduces the eight byte required size of a payload for a wireless IO device input data packet containing keystrokes adhering to the USB HID format.

The controller for the wireless IO device in an embodiment at block 508 may instruct transmission of the wireless IO device compressed input data packets to the wireless communication dongle within a data packet communication frame. For example, at the time specified within the initial polling packet 320 in an embodiment, the data packet communication frame 340 may be transmitted from the wireless IO device 380 or 390 by the IO device wireless communication polling and packet frame agent with data packet payload compression. The wireless communication dongle 330 or wireless adapter may then receive a first wireless IO device compressed input data packet 350 responsive to the initial polling packet 320 from the wireless IO device 380. During the data packet communication frame 340 in an embodiment, the wireless radio system of the wireless communication dongle 330 or the information handling system 300 may receive a plurality of wireless IO device compressed input data packets (e.g., 350 to 360) equivalent to the selected wireless IO device compressed input data packet number as defined within the initial polling packet 320. For example, in an embodiment in which the initial polling packet 320 identified an wireless IO device compressed input data packet number of five, the Nth packet 360 received by the wireless radio system of the wireless communication dongle 330 or the information handling system 300 may be the fifth of five data packets transmitted during the data packet communication frame 340 from the wireless IO device 380 or 390 to the wireless communication dongle 330 or the information handling system 300. Each of the five data packets transmitted to the wireless communication dongle 330 or the information handling system 300 in an embodiment may have the selected wireless IO device compressed input data packet number and selected wireless IO device compressed input data packet length and may be transmitted at the designated wireless IO device allotted data packet transmission time slots identified within the initial polling packet 320.

At block 510, the controller at the wireless communication dongle may execute code instructions to generate reassembled HID reports using a portion of the wireless IO device input data within received wireless IO device compressed input data packets. For example, in an embodiment described with respect to FIG. 1, the wireless communication adapter/dongle 130 in an embodiment may receive a plurality of wireless IO device compressed input data packets, each comprising a payload of compressed wireless IO device input data from one of the wireless IO devices (e.g., 180 and 190). Upon receipt of the plurality of wireless IO device compressed input data packets from the wireless IO device(s) (e.g., 180 or 190) in an embodiment, the controller 150 for the wireless communication adapter/dongle 130 may execute code instructions of the IO device wireless communication polling and packet frame system with data packet payload compression 151 to generate a USB HID formatted report from the compressed or truncated wireless IO device input data contained within the received wireless IO device compressed input data packets. The information handling system 100 may include an operating system (OS) 111 that processes incoming data from various IO devices, including the wireless IO devices 180 and 190. Such an OS 111 in an embodiment may be limited to processing such IO data only when received in the USB HID format. As described herein, the wireless IO device compressed input data packets may only include a portion of information of the wireless IO device input data required for a USB HID report meeting these standards. As such, the controller 150 in an embodiment may execute code instructions of the IO device wireless communication polling and packet frame system with data packet payload compression 151 to insert or translate the received payloads of the wireless IO device compressed input data packets into a USB HID compliant report and to add any additionally necessary data, such as full, subsequent adjusted position data values or previously truncated null values that were not included within the wireless IO device compressed input data packets.

For example, the USB HID format for a mouse may require 8 bytes of initial position measurement data (e.g., $(X_0, Y_0)$) and eight bytes of adjusted positional measurement data (e.g., $(X_1, Y_1)$) for the mouse. In such an embodiment, the wireless IO device compressed input data packet received from a wireless mouse (e.g., 180) may contain only the eight byte initial positional measurement data (e.g., $(X_0, Y_0)$) and two bytes indicating a change in positional measurement (e.g., $\Delta X, \Delta Y$). The controller 150 executing code instructions of the IO device wireless communication polling and packet frame system with data packet payload compression 151 in such an embodiment may determine the adjusted positional measurement data ((e.g., $(X_1, Y_1)$) by adding or subtracting the change in positional measurement (e.g., $\Delta X, \Delta Y$) from the initial positional measurement data (e.g., $(X_0, Y_0)$). The controller 150 executing code instructions of the IO device wireless communication polling and packet frame system with data packet payload compression 151 in such an embodiment may then generate a USB HID report containing the eight bytes of initial position measurement data (e.g., $(X_0, Y_0)$) taken directly from the wireless IO device compressed input data packet and the eight bytes of adjusted positional measurement data (e.g., $(X_1, Y_1)$) determined based on the change in positional measurement (e.g., $\Delta X, \Delta Y$). The USB HID report in such an example embodiment may then be transmitted to the OS 111 for translation of the positional measurements of the mouse, gaming controller, or touchpad into movement of the cursor on the video display 110.

As another example, the USB HID format for a mouse may require 2 bytes of data for six different keystrokes that may potentially be registered during each keystroke scan. Because the wireless keyboard (e.g., 190) in an embodiment may be operating at a high sample rate (e.g., less than 250-500 microseconds), it is highly likely that only one or two keystrokes may be registered during each keystroke scan. Thus, up to six bytes of data within each USB HID report for a keyboard may include null data, indicating a lack of a keystroke. In such an embodiment, the wireless IO device compressed input data packet received from a wireless keyboard (e.g., 190) may remove or truncate the null data such that the wireless IO device compressed input data packet only contains two bytes or four bytes of data for keystrokes that were actually registered during the previous scan. The controller 150 executing code instructions of the IO device wireless communication polling and packet frame system with data packet payload compression 151 in such an embodiment may then generate a USB HID report containing the twelve bytes of keystroke data (e.g., two bytes reserved for six potential keystrokes as required by the USB HID format) by inserting the truncated input data in the payload for the wireless IO device compressed input data packet (e.g., indicating actual keypresses), and providing null data in each of the reserved two byte slots that were truncated from the payload for the wireless IO device compressed input data packet.

The controller at the wireless communication dongle may then communicate the reassembled HID report to the OS of the information handling system at block 512 in an embodiment. For example, the USB HID report generated at block 510 may then be transmitted to the OS 111 via bus 108.

At block 514, the OS of the information handling system in an embodiment may process the HID input within the reassembled HID report and reflect that input to the user. For example, the controller in an example embodiment may generate a USB HID report containing the eight bytes of initial position measurement data (e.g., $(X_0, Y_0)$) taken directly from the wireless IO device compressed input data packet and the eight bytes of adjusted positional measurement data (e.g., $(X_1, Y_1)$) determined based on the change in positional measurement (e.g., $\Delta X, \Delta Y$). In such an example embodiment, the USB HID report may then be transmitted to the OS 111 for translation of the positional measurements of the mouse into movement of the cursor on the video display 110.

As another example, the controller in an embodiment may generate a USB HID report containing eight bytes of keystroke data (e.g., one byte reserved, one byte for registering command keys, and one byte for registering each of six possible normal keystrokes as required by the USB HID format) by inserting the truncated input data in the payload for the wireless IO device compressed input data packet (e.g., indicating actual keypresses) from a wireless keyboard, and providing null data in each of the reserved one byte slots that were truncated from the payload for the wireless IO device compressed input data packet. In such an embodiment, the HID report may be processed by the OS 111 for translation of the registered keystrokes of the keyboard into operational actions for a software application (e.g., Ctrl+C causing execution of a copy function) or display of characters on the video display 110. The method for compressing and decompressing wireless input/output (IO) device input data packet payloads prior to and following transmission between a wireless IO device and a wireless communication dongle, respectively, may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (IO) device wireless communication polling and packet frame system with data packet payload compression executing on a wireless communication dongle at an information handling system comprising:
    a microcontroller to execute code instructions of the IO device wireless communication polling and packet frame system with data packet payload compression to transmit with a wireless radio system an initial polling packet to instruct an operatively connected wireless IO device to transmit a selected number of compressed wireless IO device input data packets including a compressed wireless IO device input data payload having a selected compressed data packet length within wireless IO device allotted time slots of a data packet communication frame, where wireless IO device input data is compressed from a human interface device (HID) report format of the wireless IO device input data to decrease a size of the selected compressed data packet length transmitted by the wireless IO device in the data packet communication frame;
    the wireless radio system of the wireless communication dongle to receive within the data packet communication frame the selected number of compressed wireless IO device input data packets of the selected compressed data packet length from the wireless IO device; and
    the controller to execute code instructions to translate the compressed wireless IO device input data from the selected number of compressed wireless IO device input data packets into reassembled wireless IO device input data for the wireless IO device by regenerating the HID report format that includes the reassembled wireless IO device input data by including compressed or truncated portions for processing by a processor of the information handling system executing code instructions of an operating system (OS).

2. The IO device wireless communication polling and packet frame system with data packet payload compression executing on the wireless communication dongle of claim 1, wherein the wireless IO device is a wireless mouse and the wireless IO device input data is compressed with using offset change in position values for adjusted position data relative an initial position data value to decrease the selected compressed data packet length for wireless mouse position movement data.

3. The IO device wireless communication polling and packet frame system with data packet payload compression executing on the wireless communication dongle of claim 1, wherein the wireless IO device is a keyboard and the wireless IO device input data is truncated to eliminate keystroke bytes for null value keystrokes otherwise required in the HID report format to decrease the selected compressed data packet length for wireless keyboard keystroke data.

4. The IO device wireless communication polling and packet frame system with data packet payload compression executing on the wireless communication dongle of claim 3, wherein the wireless IO device is the keyboard and the selected compressed data packet length is six bytes shorter than the wireless IO device input data in the HID report format.

5. The IO device wireless communication polling and packet frame system with data packet payload compression executing on the wireless communication dongle of claim 1, wherein the wireless IO device is a mouse and the compressed wireless IO device input data packet payload comprises an initial position value of a mouse and a two byte measurement of an offset change in position value of the mouse from the initial position value.

6. The IO device wireless communication polling and packet frame system with data packet payload compression executing on the wireless communication dongle of claim 1, wherein the wireless IO device is a keyboard and the compressed wireless IO device input data packet payload comprises identification of a single key press by a user with all other null value keystroke bytes truncated for wireless transmission.

7. The IO device wireless communication polling and packet frame system with data packet payload compression executing on the wireless communication dongle of claim 1, wherein the HID report format that includes the reassembled wireless IO device input data regenerated by the microcontroller is sent to the information handling system to alter a cursor location on a display device or display a character on the display device to a user.

8. A method of orchestrating delivery of compressed wireless IO device input data packets from a wireless input/output (IO) device to a wireless communication dongle at an information handling system comprising:
    transmitting, via a wireless radio system, an initial polling packet generated by a controller of the wireless communication dongle to instruct an operatively connected wireless IO device to transmit a selected number of compressed input data packets including a compressed wireless IO device input data payload and having a selected compressed data packet length at wireless IO device allotted time slots within a first data packet communication frame, where wireless IO device input data is compressed from a human interface device (HID) report format of the wireless IO device input data to decrease a size of selected compressed data packet length transmitted by the wireless IO device in the data packet communication frame;
    receiving, via the wireless radio system, within the first data packet communication frame, a first transmitted number of data packets corresponding to the selected number of compressed input data packets and the selected compressed data packet length from the wireless IO device;
    translating, via the controller, the compressed input data into reassembled input data for the wireless IO device;
    generating, via the controller, a human interface device (HID) report format for the wireless IO device input data that includes the reassembled input data with compressed or truncated portions for processing by a processor of the information handling system executing code instructions of an operating system (OS); and transmitting, via the wireless radio system a second, updated polling packet acknowledging receipt of the selected number of compressed input data packets and instructing transmission by the wireless IO device of a second transmitted number of data packets corresponding to the selected number of compressed input data packets and selected compressed data packet length during a second data packet communication frame.

9. The method of claim 8, wherein the wireless IO device is a wireless mouse and the wireless IO device input data is compressed with using offset change in position values for adjusted position data relative an initial position data value to decrease the selected compressed data packet length for wireless mouse position movement data.

10. The method of claim 9, wherein the wireless IO device is the mouse and the selected compressed data packet length for adjusted position data is six bytes shorter than adjusted position data of the wireless IO device input data in the HID report format.

11. The method of claim 8, wherein the wireless IO device is a keyboard and the wireless IO device input data is truncated to eliminate keystroke bytes for null value keystrokes otherwise required in the HID report format to decrease the selected compressed data packet length for wireless keyboard keystroke data.

12. The method of claim 8, wherein the wireless IO device is a mouse and the wireless IO device input data payload of compressed wireless IO device input data comprises an initial position value of a cursor and an offset change in position value of the cursor from the initial position value for an adjusted position of the cursor.

13. The method of claim 8, wherein the wireless IO device is a keyboard and the wireless IO device input data payload of compressed wireless IO device input data comprises keystroke identification data of a single key press by a user.

14. The method of claim 8, wherein the compressed input data packets include a header with a wireless IO device identifier for the wireless IO device as well as the compressed wireless IO device input data payload to identify a type of compression for the compressed wireless IO device input data payload.

15. A wireless input/output (IO) device wireless communication polling and packet frame agent with data packet payload compression executing on a wireless IO device comprising:
  a controller to execute code instructions of the IO device wireless communication polling and packet frame agent with data packet payload compression to receive with a wireless radio system an initial polling packet instructing transmission to a wireless communication dongle of a selected number of compressed input data packets having a selected compressed data packet length within wireless IO device allotted time slots of a first data packet communication frame to decrease a size of data packets transmitted to the wireless communication dongle;
  the controller to receive a plurality of raw input data payloads for the wireless IO device from an input sensor in a universal serial bus (USB) human interface device (HID) report format;
  the controller to generate the selected number of compressed input data packets to each include a portion of one of the plurality of raw input data payloads and a compressed or truncated portion of the plurality of raw input data payloads;
  the wireless radio system of the wireless IO device to transmit to the wireless communication dongle within the first data packet communication frame a first transmitted number of data packets corresponding to the selected number of compressed input data packets of the selected compressed data packet length to the wireless communication dongle; and
  the wireless radio system to receive from the wireless communication dongle a second, updated polling packet acknowledging receipt of the selected number of compressed input data packets and instructing transmission by the wireless IO device of a second transmitted number of data packets corresponding to the selected number of compressed input data packets and selected compressed data packet length during a second data packet communication frame.

16. The IO device wireless communication polling and packet frame system with data packet payload compression executing on the wireless IO device of claim 15, wherein the compressed input data packets include a header with a wireless IO device identifier for the wireless IO device to identify a type of compression for the raw input data payloads in compressed input data packets.

17. The IO device wireless communication polling and packet frame agent with data packet payload compression executing on the wireless IO device of claim 15, wherein the wireless IO device is a mouse, each of the plurality of raw input data payloads include an initial positional coordinate value comprising eight bytes of data and an adjusted positional coordinate value comprising eight bytes of data in the USB HID report format that is compressed to the portion of one of the plurality of raw input data payloads includes the initial positional coordinate value at eight bytes and the compressed or truncated portion of the plurality of raw input data payloads includes a two byte offset change in adjusted position value relative to the initial positional coordinate value as the adjusted positional coordinate value in the compressed input data packets.

18. The IO device wireless communication polling and packet frame agent with data packet payload compression executing on the wireless IO device of claim 15, wherein the wireless IO device is a wireless mouse and each of the plurality of raw input data payloads include an initial positional coordinate value and an adjusted positional coordinate value that is an offset change in position value relative to the initial position coordinate value in the compressed input data packets for the wireless mouse.

19. The IO device wireless communication polling and packet frame agent with data packet payload compression executing on the wireless IO device of claim 15, wherein the wireless IO device is a keyboard further comprising:
  the controller to generate the selected number of compressed input data packets by removing one or more one byte null fields from each of the plurality of raw input data payloads indicating no detected key press from the compressed input data packets.

20. The IO device wireless communication polling and packet frame agent with data packet payload compression executing on the wireless IO device of claim 15 further comprising:
  the controller to set the wireless IO device sample rate based on selected compressed data packet length within the wireless IO device allotted time slots identified within the initial polling packet.

* * * * *